US012490260B2

United States Patent
Yao et al.

(10) Patent No.: US 12,490,260 B2
(45) Date of Patent: *Dec. 2, 2025

(54) RETRANSMISSION OF MsgB IN TWO-STEP RANDOM ACCESS PROCEDURE

(71) Applicant: Apple Inc., Cupertino, CA (US)

(72) Inventors: Chunhai Yao, Beijing (CN); Clive E. Rodgers, Palo Alto, CA (US); Dawei Zhang, Saratoga, CA (US); Fangli Xu, Beijing (CN); Haijing Hu, Los Gatos, CA (US); Haitong Sun, Saratoga, CA (US); Wei Zeng, Saratoga, CA (US); Yuqin Chen, Shenzhen (CN); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/652,003

(22) Filed: May 1, 2024

(65) Prior Publication Data

US 2024/0284518 A1 Aug. 22, 2024

Related U.S. Application Data

(63) Continuation of application No. 18/334,933, filed on Jun. 14, 2023, now Pat. No. 12,010,730, which is a
(Continued)

(51) Int. Cl.
*H04W 72/1268* (2023.01)
*H04W 74/00* (2009.01)
(Continued)

(52) U.S. Cl.
CPC ..... *H04W 72/1268* (2013.01); *H04W 74/006* (2013.01); *H04W 74/0836* (2024.01); *H04W 74/0833* (2013.01)

(58) Field of Classification Search
CPC .......... H04W 74/0833; H04W 74/006; H04W 72/1268
(Continued)

(56) References Cited

U.S. PATENT DOCUMENTS

| 2018/0279377 A1 | 9/2018 | Lin |
| 2019/0132882 A1 | 5/2019 | Li |

(Continued)

FOREIGN PATENT DOCUMENTS

| CN | 101695196 | 4/2010 |
| CN | 102595634 | 7/2012 |

(Continued)

OTHER PUBLICATIONS

R1-1909668, "Feature lead summary#1 on 2 step RACH procedures", 3GPP TSG RAN WG1 #97, Prague, Czech Republic, Aug. 26-30, 2019, Source: Nokia, Nokia Shanghai Bell (Year: 2019).*
(Continued)

*Primary Examiner* — Intekhaab A Siddiquee
(74) *Attorney, Agent, or Firm* — Kowert, Hood, Munyon, Rankin & Goetzel, P.C.

(57) ABSTRACT

A wireless user equipment (UE) device may transmit a random access preamble to a base station, using a physical resource on an uplink signal. After failing to receive an initial transmission of a response message from the base station (BS), the UE device may monitor for one or more retransmissions of the response message. Each of the retransmission may include a corresponding transmission number. As an alternative, each of the retransmissions may be at least partially scrambled using a corresponding Radio Network Temporary Identifier (RNTI). As another alternative, a window for monitoring and RNTI calculation may be extended to include the one or more retransmissions. The successive retransmissions may include the same set of
(Continued)

UE-specific payloads, or, a decreasing set of payloads over time as UE devices acknowledge successful receipt of their respective payloads.

20 Claims, 13 Drawing Sheets

Related U.S. Application Data continuation of application No. 17/040,437, filed as application No. PCT/CN2019/108881 on Sep. 29, 2019, now Pat. No. 11,723,073.

(51) Int. Cl.
 *H04W 74/0833* (2024.01)
 *H04W 74/0836* (2024.01)
(58) Field of Classification Search
 USPC .......................................................... 370/329
 See application file for complete search history.

(56) References Cited

U.S. PATENT DOCUMENTS

| | | | |
|---|---|---|---|
| 2019/0268060 A1 | 8/2019 | Nam | |
| 2019/0320467 A1 | 10/2019 | Freda | |
| 2020/0107372 A1* | 4/2020 | Agiwal | H04W 80/02 |
| 2020/0146069 A1 | 5/2020 | Chen | |
| 2020/0314913 A1 | 10/2020 | Rastegardoost | |
| 2020/0351955 A1* | 11/2020 | Jeon | H04W 76/27 |
| 2021/0120581 A1 | 4/2021 | Kim | |
| 2022/0304075 A1 | 9/2022 | Lin | |

FOREIGN PATENT DOCUMENTS

| | | |
|---|---|---|
| CN | 109151902 | 1/2019 |
| CN | 109845378 | 6/2019 |
| CN | 109892000 | 6/2019 |
| WO | 2013107036 | 7/2013 |
| WO | 2020191584 | 10/2020 |
| WO | 2020199014 | 10/2020 |
| WO | WO-2020191584 A1 * | 10/2020 |

OTHER PUBLICATIONS

International Search Report for International application No. PCT/CN2019/108881; Sep. 29, 2019.
Extended European Search Report for EP Patent Application No. 19946548.5; Mar. 20, 2023.
Nokia et al. "On 2-step RACH Procedure"; 3GPP TSG RAN WG1 #97 R1-1906747; May 13, 2019.
"3rd Generation Partnership Project; Technical Specification Group Radio Access Network; NR; Medium Access Control (MAC) protocol specification (Release 15)"; 3GPP TS 38.321 V15.7.0; Sep. 27, 2019.
Huawei et al. "Discussion on 2-step RACH procedure"; 3GPP TSG RAN WG1 Meeting #97 R1-1906051; May 13, 2019.
Nokia et al. "Feature lead summary#4 on 2 step RACH procedures"; 3GPP TSG RAN WG1 #98 R1-1909775; Aug. 26, 2019.
Apple "MsgB Retransmission Scheme"; 3GPP TSG-RAN WG2 Meeting #107bis R2-1912468; Oct. 14, 2019.
Office Action for CN Patent Application No. 201980100874.5, Aug. 31, 2024.
Office Action for KR Patent Application No. 10-2022-7009885; Nov. 13, 2024.
Sony "Discussion on Procedure for 2-step RACH", 3GPP TSG RAN WG1 #98 R1-1908763; Aug. 26, 2019.
Notice of Allowance for KR 10-2022-7009885; Jul. 29, 2025.
Nokia et al. "RNTI design for MsgB reception" 3GPP TSG RAN WG2 Meeting #106 R2-1907071; May 13, 2019.
Nokia et al. "RNTI design for MsgB reception" 3GPP TSG RAN WG2 Meeting #105bis R2-1904034; Apr. 8, 2019.
Nokia et al. "Feature lead summary#1 on 2 step RACH procedures" 3GPP TSG RAN WG1 #97 R1-1909668; Aug. 26, 2019.
Vivo et al. "Differentiation Between 2-step and 4-step RACH" 3GPP TSG RAN WG2 Meeting #107 R2-1908704; Aug. 26, 2019.
Spreadtrum Communications "Discussion on 2-step RACH procedure" 3GPP TSG RAN WG1 Meeting #98 R1-1908967; Aug. 26, 2019.
Huawei et al. "Discussion on 2-step RACH procedure" 3GPP TSG RAN WG1 Meeting #98 R1-1908034; Aug. 26, 2019.
Nokia et al. "On 2-step RACH Channel Structure" 3GPP TSG RAN WG1 #97 R1-1906746; May 13, 2019.

* cited by examiner

1800

```
after failing to receive an initial transmission of a downlink message
from a base station, monitor for one or more retransmissions of the
downlink message, wherein the downlink message is part of a
random access procedure    1810
```

```
after determining that an initial transmission of a downlink message
to a user equipment device has failed, perform one or more
retransmissions of the downlink message, wherein the downlink
message is part of a two-step random access procedure    1910
```

*FIG. 19*

RETRANSMISSION OF MsgB IN TWO-STEP RANDOM ACCESS PROCEDURE

PRIORITY CLAIM INFORMATION

This application is a continuation of U.S. application Ser. No. 18/334,933, filed on Jun. 14, 2023, titled "Retransmission of MsgB in Two-Step Random Access Procedure", which is a continuation of U.S. application Ser. No. 17/040,437, filed on Sep. 22, 2020, titled "Retransmission of MsgB in Two-Step Random Access Procedure", which is a national stage application of International Application No. PCT/CN2019/108881, filed on Sep. 29, 2019, titled "Retransmission of MsgB in Two-Step Random Access Procedure", which are hereby incorporated by reference in their entirety as though fully and completely set forth herein.

FIELD

The present disclosure relates to the field of wireless communication, and more particularly, to mechanisms enabling a user equipment devices to perform random access with improved performance.

DESCRIPTION OF THE RELATED ART

When a user equipment (UE) device is powered on, it may perform an initial access procedure which includes a random access procedure. The random access procedure may include transmitting a (randomly selected) preamble to a base station over a contention based channel. The base station receives the preamble, and calculates a Radio Network Temporary Identity (RNTI) based on location parameters of the physical resource in which the preamble was received. The base station may then scramble the downlink control information of a random access response (RAR) message using the calculated RNTI. The UE device monitors a downlink signal for the RAR message using its knowledge of the RNTI. However, if the UE device fails to receive the RAR message, it may resort to transmitting another preamble, i.e., restarting the random access procedure. Thus, there exists a need for mechanisms capable of improving the performance of random access procedure for wireless UE devices and wireless networks.

SUMMARY

In one set of embodiments, a method for operating a wireless user equipment (UE) device may include: after failing to receive an initial transmission of a downlink message from a base station, monitoring for one or more retransmissions of the downlink message, wherein the downlink message is part of a two-step random access procedure.

In some embodiments, the action of monitoring may include attempting to decode control information in a first of the one or more retransmissions using a Radio Network Temporary Identity (RNTI) that was previously used to attempt decoding of control information in the initial transmission. The RNTI may be based on location parameters of physical uplink resource(s) that was used by the UE device to transmit a random access preamble.

In some embodiments, the method may also include: recovering a transmission number from the first retransmission; and comparing the transmission number with a current window number of the UE device in order to determine whether the first retransmission includes random access response (RAR) information targeted for the UE device.

In some embodiments, the method may also include receiving a configuration message from the base station prior to performing said monitoring. The configuration message may indicate a time duration of a window for said monitoring, wherein the time duration is sufficiently large to include up to N transmissions of the downlink message, wherein N is greater than one.

In some embodiments, the action of monitoring may include attempting to decode control information in a first of the one or more retransmissions using a Radio Network Temporary Identity (RNTI) that is different from an RNTI that was used to attempt decoding of the initial transmission.

In some embodiments, the RNTI used to attempt decoding of the first retransmission may depend at least in part on a window number in which the first retransmission is received.

In some embodiments, the initial transmission of the downlink message may include data portions targeted respectively to UE devices including said UE device. The first retransmission may also include those data portions. Alternatively, the first retransmission may include only a proper subset of the data portions, where the proper subset includes a given data portion that is targeted for said UE device.

In some embodiments, the method may also include transmitting an acknowledgement message in response to successfully receiving the first retransmission.

In some embodiments, the downlink message may include at least one grant of uplink and/or downlink transmission resources and at least one contention resolution identity.

BRIEF DESCRIPTION OF THE DRAWINGS

A better understanding of the present subject matter can be obtained when the following detailed description of the preferred embodiment is considered in conjunction with the following drawings.

FIG. 18 illustrates an example of a method for operating a user equipment (UE) device to monitor one or more retransmissions of a downlink message, as part of a two-step random access procedure, according to some embodiments.

FIG. 19 illustrates an example of a method for operating a base station to perform one or more retransmissions of a downlink message, as part of a two-step random access procedure, according to some embodiments.

Figure 1:
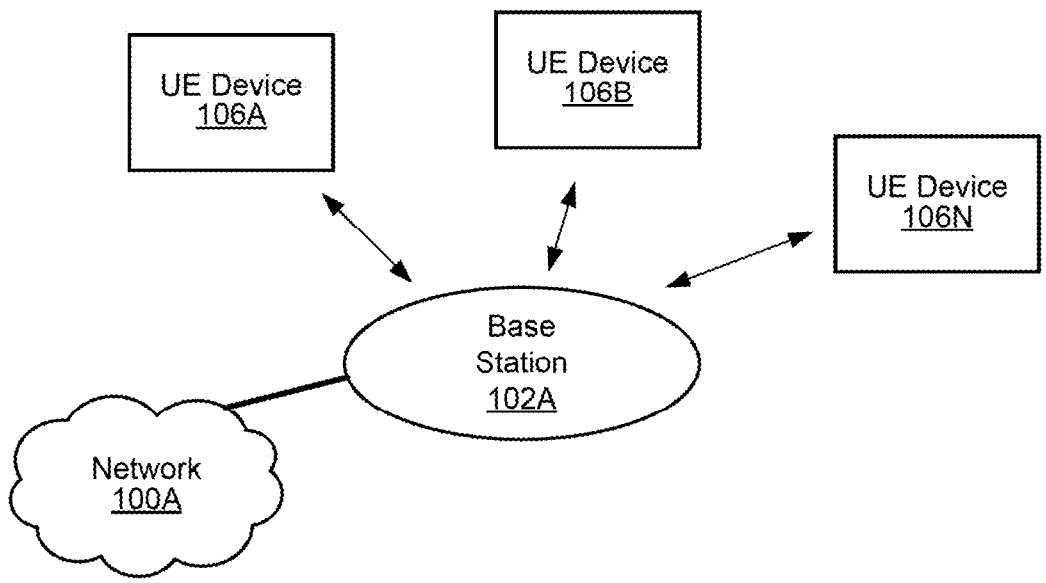
FIGS. 1-2 illustrate examples of wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
5G NR: 5th Generation New Radio
ARQ: Automatic Repeat Request
BW: Bandwidth
BWP: Bandwidth Part
DC: Dual Connectivity
DCI: Downlink Control Information
DL: Downlink
eNB (or eNodeB): Evolved Node B, i.e., the base station of 3GPP LTE
eUICC: embedded UICC
gNB (or gNodeB): next Generation NodeB, i.e., the base station of 5G NR
GSM: Global System for Mobile Communications
HARQ: Hybrid ARQ
LTE: Long Term Evolution
LTE-A: LTE-Advanced
MAC: Medium Access Control
MAC-CE: MAC Control Element
NR: New Radio
NW: Network
PDCCH: Physical Downlink Control Channel
PDSCH: Physical Downlink Shared Channel
PDU: Protocol Data Unit
PUCCH: Physical Uplink Control Channel
PUSCH: Physical Uplink Shared Channel
PRACH: Physical Random Access Channel
RACH: Random Access Channel
RAT: Radio Access Technology
RNTI: Radio Network Temporary Identity
RRC: Radio Resource Control
SR: Scheduling Request
UE: User Equipment
UL: Uplink
UMTS: Universal Mobile Telecommunications System Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to any of various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
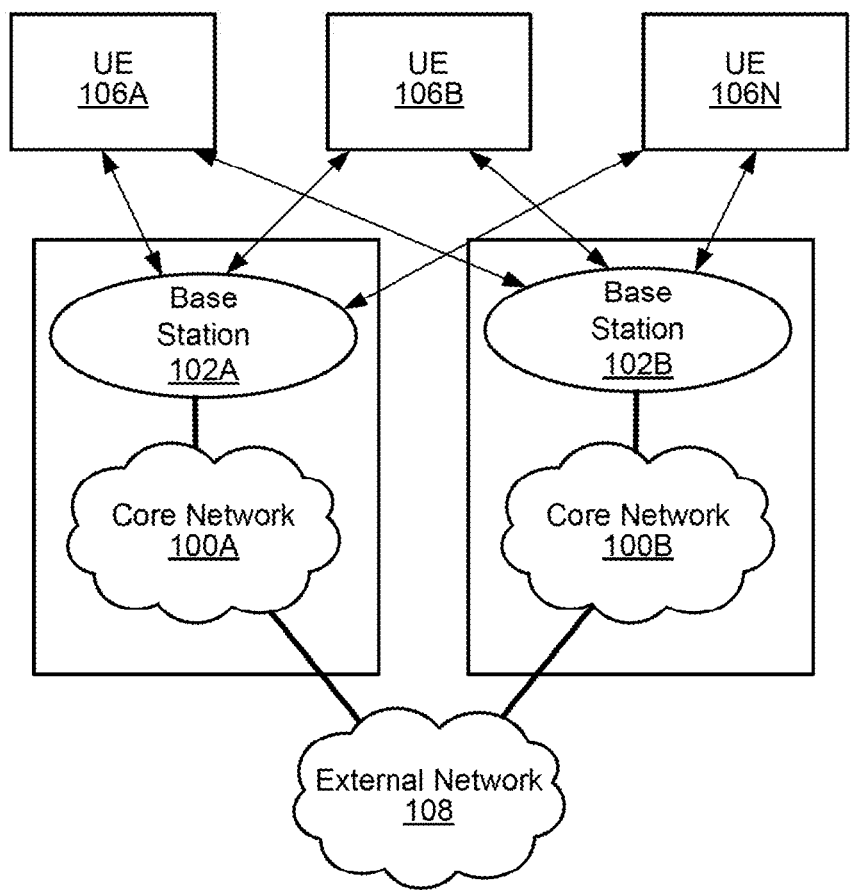
Figure 3:
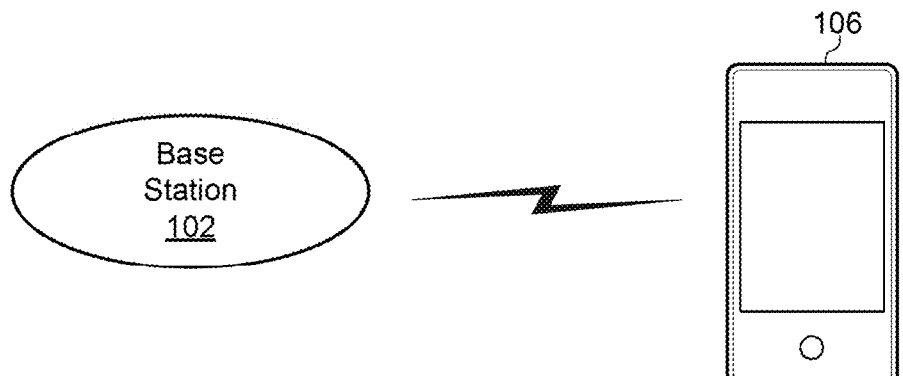
FIG. 3 illustrates an example of a base station in communication with a user equipment device, according to some embodiments.

FIGS. 1-3: Communication System

FIGS. 1 and 2 illustrate exemplary (and simplified) wireless communication systems. It is noted that the systems of FIGS. 1 and 2 are merely examples of certain possible systems, and various embodiments may be implemented in any of various ways, as desired.

The wireless communication system of FIG. 1 includes a base station 102A which communicates over a transmission medium with one or more user equipment (UE) devices 106A, 106B, etc., through 106N. Each of the user equipment devices may be referred to herein as "user equipment" (UE). In the wireless communication system of FIG. 2, in addition to the base station 102A, base station 102B also communicates (e.g., simultaneously or concurrently) over a transmission medium with the UE devices 106A, 106B, etc., through 106N.

The base stations 102A and 102B may be base transceiver stations (BTSs) or cell sites, and may include hardware that enables wireless communication with the user devices 106A through 106N. Each base station 102 may also be equipped to communicate with a core network 100 (e.g., base station 102A may be coupled to core network 100A, while base station 102B may be coupled to core network 100B), which may be a core network of a cellular service provider. Each core network 100 may be coupled to one or more external networks (such as external network 108), which may include the Internet, a Public Switched Telephone Network (PSTN), or any other network. Thus, the base station 102A may facilitate communication between the user devices and/or between the user devices and the network 100A; in the system of FIG. 2, the base station 102B may facilitate communication between the user devices and/or between the user devices and the network 100B.

The base stations 102A and 102B and the user devices may be configured to communicate over the transmission medium using any of various radio access technologies (RATs), also referred to as wireless communication technologies, or telecommunication standards, such as 5G NR, GSM, UMTS (WCDMA), LTE, LTE-Advanced (LTE-A), 3GPP2 CDMA2000 (e.g., 1×RTT, 1×EV-DO, HRPD, cHRPD), Wi-Fi, WiMAX etc.

For example, base station 102A and core network 100A may operate according to a first cellular communication standard (e.g., LTE or 5G NR) while base station 102B and core network 100B operate according to a second (e.g., different) cellular communication standard (e.g., GSM, UMTS, and/or one or more CDMA2000 cellular communication standards). The two networks may be controlled by the same network operator (e.g., cellular service provider or "carrier"), or by different network operators. In addition, the two networks may be operated independently of one another (e.g., if they operate according to different cellular communication standards), or may be operated in a somewhat coupled or tightly coupled manner.

Note also that while two different networks may be used to support two different cellular communication technologies, such as illustrated in the network configuration shown in FIG. 2, other network configurations implementing multiple cellular communication technologies are also possible. As one example, base stations 102A and 102B might operate according to different cellular communication standards but couple to the same core network. As another example, multi-mode base stations capable of simultaneously supporting different cellular communication technologies (e.g., two or more of 5G NR, LTE, CDMA 1×RTT, GSM and UMTS, or any desired combination of cellular communication technologies) might be coupled to a core network that also supports the different cellular communication technologies. Any of various other network deployment scenarios are also possible.

As a further possibility, it is also possible that base station 102A and base station 102B may operate according to the same wireless communication technology (or an overlapping set of wireless communication technologies). For example, base station 102A and core network 100A may be operated by one cellular service provider independently of base station 102B and core network 100B, which may be operated by a different (e.g., competing) cellular service provider. Thus in this case, despite utilizing similar and possibly compatible cellular communication technologies, the UE devices 106A-106N might communicate with the base stations 102A-102B independently, possibly by utilizing separate subscriber identities to communicate with different carriers' networks.

A UE 106 may be capable of communicating using a plurality of wireless communication standards. For example, a UE 106 might be configured to communicate using different 3GPP cellular communication standards (such as two or more of GSM, UMTS, LTE, LTE-A, and 5G NR). (In some embodiments, a UE 106 might be configured to communicate using both 5G NR and 3GPP LTE.) As another example, a UE 106 might be configured to communicate using either or both of a 3GPP cellular communication standard (such as 5G NR or LTE) and a 3GPP2 cellular communication standard (such as a cellular communication standard in the CDMA2000 family of cellular communication standards). Thus, as noted above, a UE 106 might be configured to communicate with base station 102A (and/or with other base stations) according to a first cellular communication standard (e.g., 5G NR or LTE) and might also be configured to communicate with base station 102B (and/or other base stations) according to a second cellular communication standard (e.g., 5G NR, LTE, one of the CDMA2000 cellular communication standards, UMTS, GSM, etc.).

Base stations 102A and 102B and other base stations operating according to the same or different cellular communication standards may thus be provided as one or more networks of cells, which may provide continuous or nearly continuous overlapping service to UEs 106A-106N and similar devices over a wide geographic area via one or more cellular communication standards.

A UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 3 illustrates user equipment 106 (e.g., one of the devices 106A through 106N) in communication with a base station 102 (e.g., one of the base stations 102A or 102B). The UE 106 may be a device with wireless network connectivity such as a mobile phone, a hand-held device, a computer or a tablet, a wearable device or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS (W-CDMA, TD-SCDMA, etc.), CDMA2000 (1×RTT, 1×EV-DO, HRPD, cHRPD, etc.), LTE, LTE-A, 5G NR, WLAN, or GNSS. Other combinations of wireless communication standards are also possible.

The UE 106 may include one or more antennas for communicating using one or more wireless communication protocols. Within the UE 106, one or more parts of a receive and/or transmit chain may be shared between multiple wireless communication standards; for example, the UE 106 might be configured to communicate using either (or both) of GSM or LTE using a single shared radio. The shared radio may include a single antenna, or may include multiple antennas (e.g., for MIMO or beamforming) for performing wireless communications. MIMO is an acronym for Multi-Input Multiple-Output.

Figure 4:
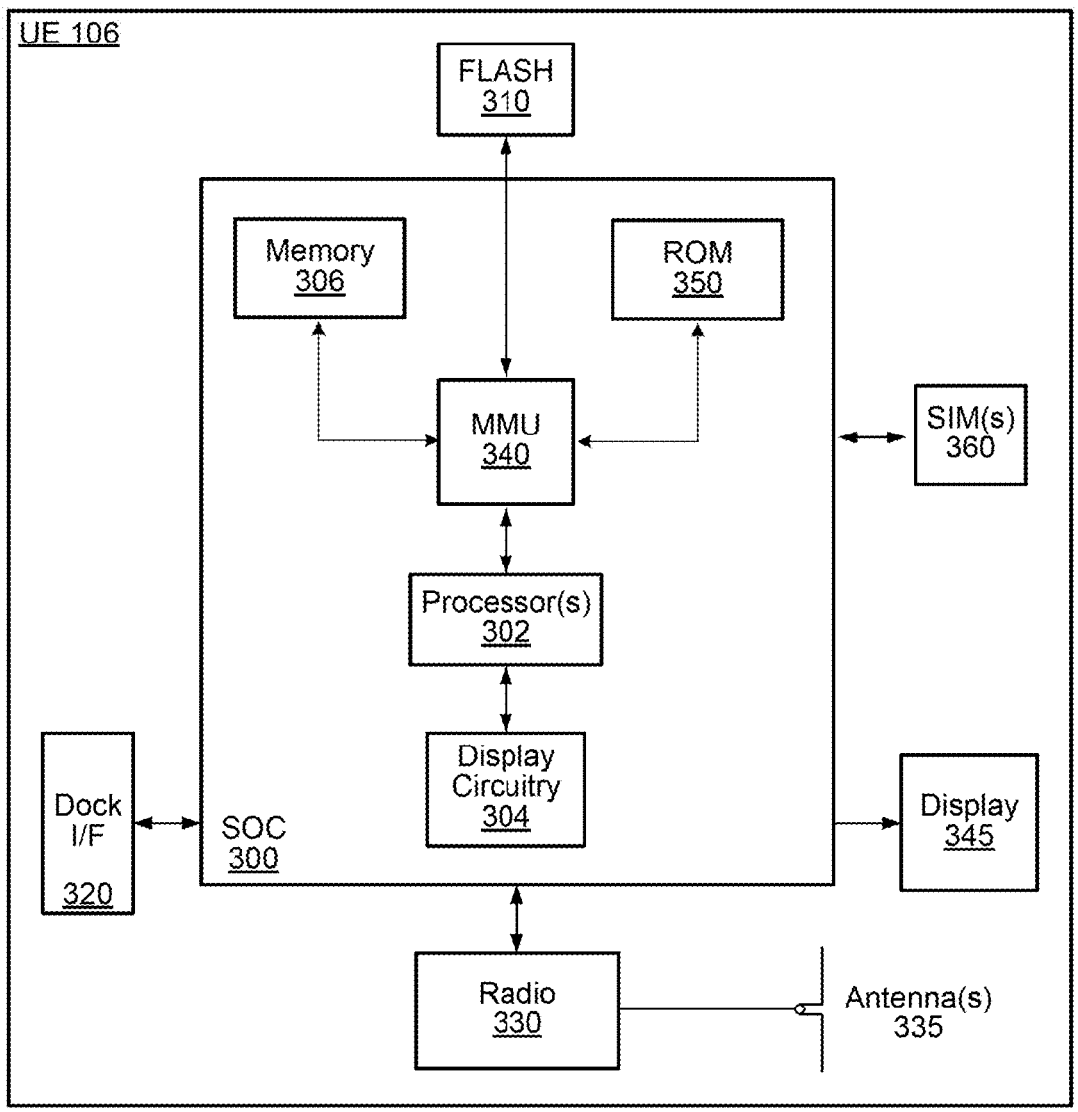
FIG. 4 illustrates an example of a block diagram of a user equipment device, according to some embodiments.

FIG. 4—Example of Block Diagram of a UE

FIG. 4 illustrates an example of a block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including Flash memory 310), a connector interface 320 (e.g., for coupling to a computer system, dock, charging station, etc.), the display 345, and radio 330.

The radio 330 may include one or more RF chains. Each RF chain may include a transmit chain, a receive chain, or both. For example, radio 330 may include two RF chains to support dual connectivity with two base stations (or two cells). The radio may be configured to support wireless communication according to one or more wireless communication standards, e.g., one or more of GSM, UMTS, LTE, LTE-A, WCDMA, CDMA2000, Bluetooth, Wi-Fi, GPS, etc.

The radio 330 couples to antenna subsystem 335, which includes one or more antennas. For example, the antenna subsystem 335 may include a plurality of antennas to support applications such as dual connectivity or MIMO or beamforming. The antenna subsystem 335 transmits and receives radio signals to/from one or more base stations or devices through the radio propagation medium, which is typically the atmosphere.

In some embodiments, the processor(s) 302 may include a baseband processor to generate uplink baseband signals and/or to process downlink baseband signals. The processor(s) 302 may be configured to perform data processing according to one or more wireless telecommunication standards, e.g., one or more of GSM, UMTS, LTE, LTE-A, WCDMA, CDMA2000, Bluetooth, Wi-Fi, GPS, etc.

The UE 106 may also include one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more sensors, one or more buttons, sliders, and/or dials, and/or any of various other elements capable of providing information to a user and/or receiving/interpreting user input.

As shown, the UE 106 may also include one or more subscriber identity modules (SIMs) 360. Each of the one or more SIMs may be implemented as an embedded SIM (eSIM), in which case the SIM may be implemented in device hardware and/or software. For example, in some embodiments, the UE 106 may include an embedded UICC (eUICC), e.g., a device which is built into the UE 106 and is not removable. The eUICC may be programmable, such that one or more eSIMs may be implemented on the eUICC. In other embodiments, the eSIM may be installed in UE 106 software, e.g., as program instructions stored on a memory medium (such as memory 306 or Flash 310) executing on a processor (such as processor 302) in the UE 106. As one example, a SIM 360 may be an application which executes on a Universal Integrated Circuit Card (UICC). Alternatively, or in addition, one or more of the SIMs 360 may be implemented as removeable SIM cards.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as or include: a programmable hardware element, such as an FPGA (Field Programmable Gate Array); or an ASIC (Application Specific Integrated Circuit); or a combination thereof.

Figure 5:
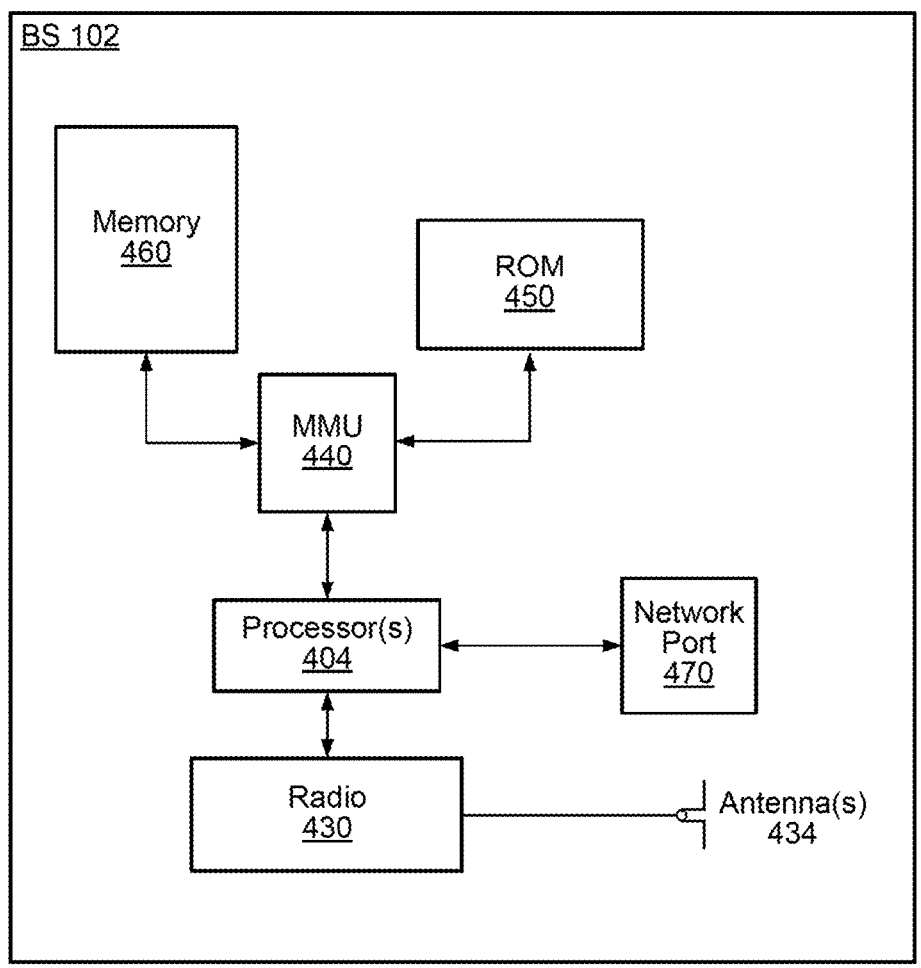
FIG. 5 illustrates an example of a block diagram of a base station, according to some embodiments.

FIG. 5—Example of a Base Station

FIG. 5 illustrates a block diagram of a base station 102. It is noted that the base station of FIG. 5 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory ROM 450) or to other circuits or devices.

The base station 102 may include at least one network port 470. The network port 470 may be configured to couple to a telephone network and provide access (for a plurality of devices, such as UE devices 106) to the telephone network, as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include a radio 430 having one or more RF chains. Each RF chain may include a transmit chain, a receive chain, or both. (For example, the base station 102 may include at least one RF chain per sector or cell.) The radio 430 couples to antenna subsystem 434, which includes one or more antennas. Multiple antennas would be needed, e.g., to support applications such as MIMO or beamforming. The antenna subsystem 434 transmits and receives radio signals to/from UEs through the radio propagation medium (typically the atmosphere).

In some embodiments, the processor(s) 404 may include a baseband processor to generate downlink baseband signals and/or to process uplink baseband signals. The baseband processor 430 may be configured to operate according to one or more wireless telecommunication standards, including, but not limited to, GSM, LTE, WCDMA, CDMA2000, etc.

The processor(s) 404 of the base station 102 may be configured to implement part or all of the methods described herein, e.g., by executing program instructions stored on a memory medium (e.g., a non-transitory computer-readable memory medium). In some embodiments, the processor(s) 404 may include: a programmable hardware element, such as an FPGA (Field Programmable Gate Array); or an ASIC (Application Specific Integrated Circuit); or a combination thereof.

Wireless User Equipment Device 600

Figure 6:
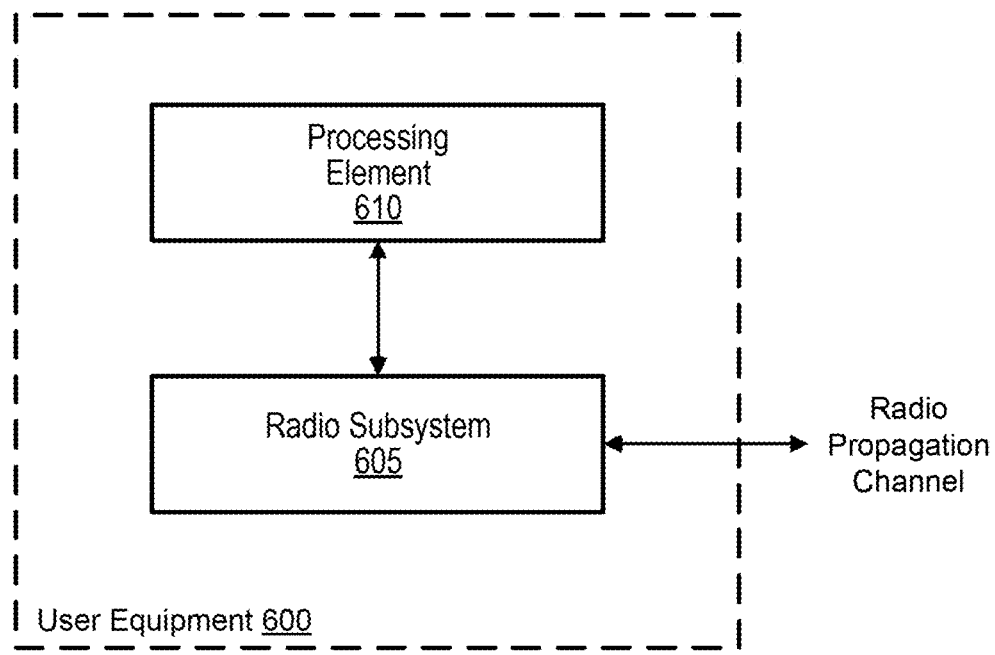
FIG. 6 illustrates an example of a user equipment 600, according to some embodiments.

In some embodiments, a wireless user equipment (UE) device 600 may be configured as shown in FIG. 6. UE device 600 may include: a radio subsystem 605 for performing wireless communication; and a processing element 610 operatively coupled to the radio subsystem. (UE device 600 may also include any subset of the UE features described above, e.g., in connection with FIGS. 1-4.)

The radio subsystem 605 may include one or more RF chains, e.g., as variously described above. Each RF chain may be configured to receive signals from the radio propagation channel and/or transmit signals onto the radio propagation channel. Thus, each RF chain may include a transmit chain and/or a receive chain. The radio subsystem 605 may be coupled to one or more antennas (or arrays of antennas) to facilitate signal transmission and reception. Each RF chain (or, some of the RF chains) may be tunable to a desired frequency, thus allowing the RF chain to receive or transmit at different frequencies at different times.

The radio subsystem 605 may be coupled to one or more antenna panels (or antenna arrays), e.g., to support beamforming of received downlink signals and/or transmitted uplink signals.

The processing element 610 may be coupled to the radio subsystem, and may be configured, e.g., as variously described above. (For example, the processing element may be realized by processor(s) 302.) The processing element may be configured to control the state of each RF chain in the radio subsystem.

In some embodiments, the processing element may include one or more baseband processors to (a) generate baseband signals to be transmitted by the radio subsystem and/or (b) process baseband signals provided by the radio subsystem.

In various embodiments described herein, when a processing element of a wireless user equipment device is said to transmit and/or receive information to/from a wireless base station, it should be understood that such transmission and/or reception occurs by the agency of a radio subsystem such as radio subsystem 605. Transmission may involve the submission of signals and/or data to the radio subsystem, and reception may involve the action of receiving signals and/or data from the radio subsystem.

In some embodiments, the UE device 600 may include beamforming circuitry. The beamforming circuitry may be configured to receive downlink signals from respective antennas of an antenna array of the UE device, and to apply receive beamforming to the downlink signals. For example, the beamforming circuitry may apply weights (e.g., complex weights) to the respective downlink signals, and then combine the weighted downlink signals to obtain a beam signal, where the weights define a reception beam. The beamforming circuitry may also be configured to apply weights to respective copies of an uplink signal, and to transmit the weighted uplink signals via respective antennas of the antenna array of the UE device, wherein the weights define a transmission beam.

In some embodiments, the beamforming circuitry may be implemented by (or included in) the processing element 610. In other embodiments, beamforming circuitry may be included in the radio subsystem 605.

In some embodiments, the UE device 600 (e.g., the processing element 610) may be configured to receive a configuration message from the base station. The configuration message may direct the UE device to measure one or more beams, and to report the measurement(s) to the base station. The configuration message may request any of different types of reporting, e.g., periodic, semi-static, aperiodic, etc. The configuration message may indicate any of different types of measurements, e.g., signal to interference-and-noise ratio (SINR), any of various types of channel quality information (CQI), reference signal receiver power (RSRP), etc.

In some embodiments, the radio subsystem 605 may be configured to transmit and receive in a plurality of frequency bands (or frequency ranges). One or more of those frequency bands may occur in the millimeter wave regime of the electromagnetic spectrum, where the effects of propagation loss and signal blockage may be significant. Thus, the use of beamforming at the UE device 600 (and/or at the base station) may be useful in mitigating such effects. To enhance the effectiveness of beamforming, the UE device 600 may provide reports of signal quality on one or more beams, e.g., as configured by the base station.

In some embodiments, the UE 600 (e.g., the processing element) may support carrier aggregation. Carrier aggregation (CA) involves the concatenation of a plurality of component carriers (CCs), which increases the bandwidth and data rate to and/or from the UE 600. When carrier aggregation is employed, the timing of frames may be aligned across cells involved in the aggregation. Different embodiments may support different maximum bandwidths and numbers of component carriers. In some embodiments, the UE 600 may concatenate component carriers from two or more base stations, of the same or different radio access technology. (For example, in some embodiments, the UE may perform carrier aggregation with an eNB of 3GG LTE and a gNB of 5G NR.) In some embodiments, the UE 600 may support both contiguous carriers and non-contiguous carriers.

In some embodiments, in a dual connectivity mode of operation, the processing element may direct a first RF chain to communicate with a first base station using a first radio access technology and direct a second RF chain to communicate with a second base station using a second radio access technology. For example, the first RF chain may communicate with an LTE eNB, and the second RF chain may communicate with a gNB of 5G New Radio (NR). The link with the LTE eNB may be referred to as the LTE branch. The link with the gNB may be referred to as the NR branch. In some embodiments, the processing element may include a first subcircuit for baseband processing with respect to the LTE branch and a second subcircuit for baseband processing with respect to the NR branch.

The processing element 610 may be further configured as variously described in the sections below.

Wireless Base Station 700

Figure 7:
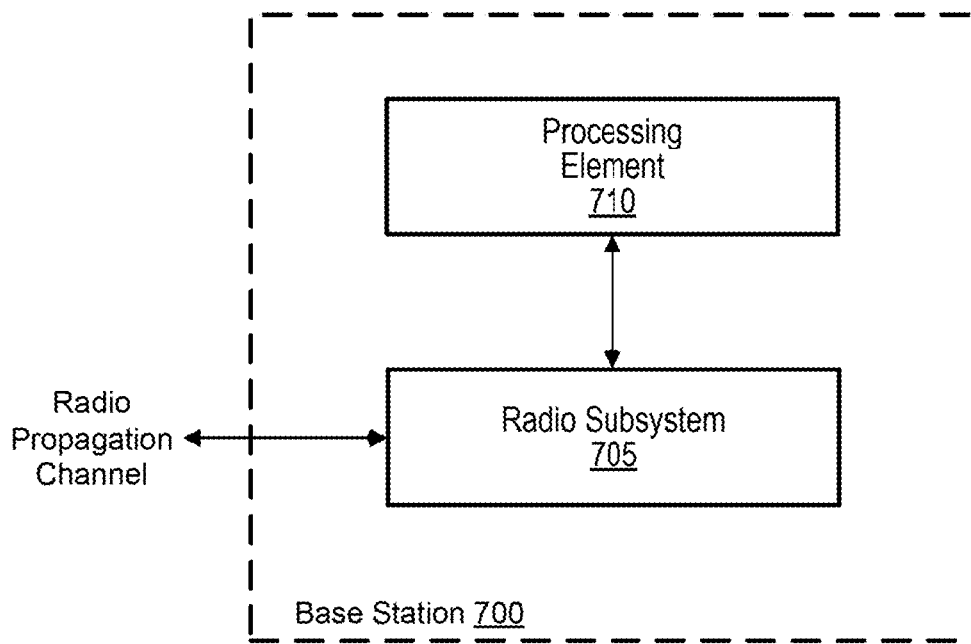
FIG. 7 illustrates an example of a base station 700, according to some embodiments. The base station 700 may be used to communicate with user equipment 600 of FIG. 6.

In some embodiments, a wireless base station 700 of a wireless network (not shown) may be configured as shown in FIG. 7. The wireless base station may include: a radio subsystem 705 for performing wireless communication over a radio propagation channel; and a processing element 710 operatively coupled to the radio subsystem. (The wireless base station may also include any subset of the base station features described above, e.g., the features described above in connection with FIG. 5.)

The radio subsystem 705 may include one or more RF chains. Each RF chain may be tunable to a desired frequency, thus allowing the RF chain to receive or transmit at different frequencies at different times.

The processing element 710 may be realized as variously described above. For example, in one embodiment, processing element 710 may be realized by processor(s) 404. In some embodiments, the processing element may include one or more baseband processors to: (a) generate baseband signals to be transmitted by the radio subsystem, and/or, (b) process baseband signals provided by the radio subsystem.

In some embodiments, the base station 700 may include beamforming circuitry. The beamforming circuitry may be configured to receive uplink signals from respective antennas of an antenna array of the base station, and to apply receive beamforming to the uplink signals. For example, the beamforming circuitry may apply weights (e.g., complex weights) to the respective uplink signals, and then combine the weighted uplink signals to obtain a beam signal, where the weights define a reception beam. Different reception beams may be used to receive from different UE devices. The beamforming circuitry may also be configured to apply weights to respective copies of a downlink signal, and to transmit the weighted downlink signals via respective antennas of the antenna array of the base station, where the weights define a transmission beam. Different transmission beams may be used to transmit to different UE devices.

In some embodiments, the beamforming circuitry may be implemented by (or included in) the processing element 710. In other embodiments, beamforming circuitry may be included in the radio subsystem 705.

The processing element 710 may be configured to perform any of the base station method embodiments described herein.

Two-Step Random Access Procedure for Initial Access

Figure 8:
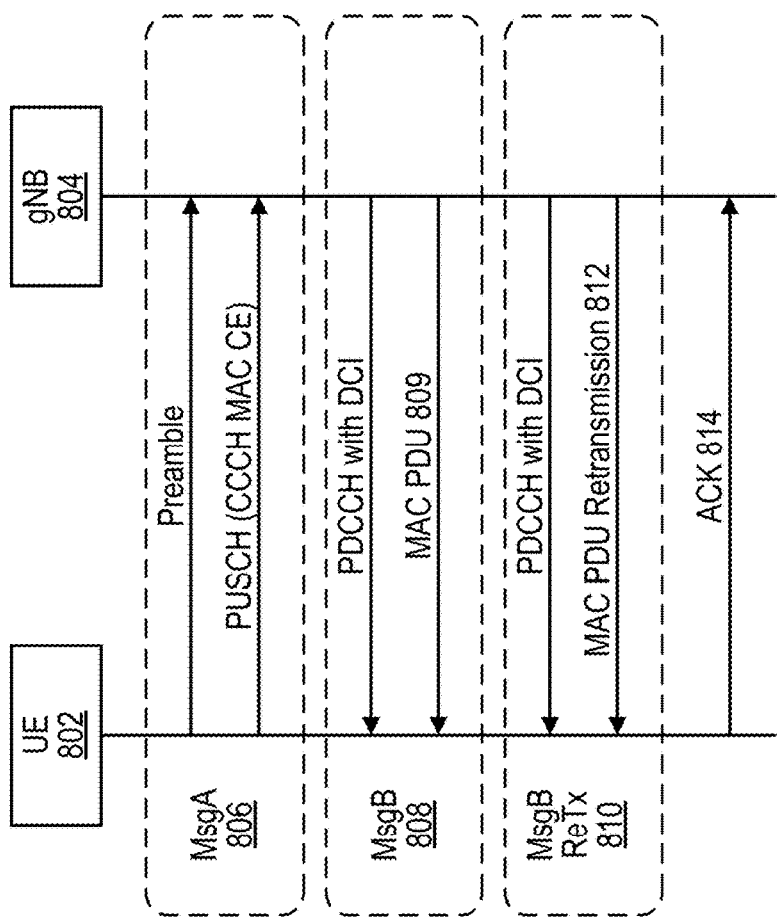
FIG. 8 illustrates an example of a two-step random access procedure, with retransmission of a second message (e.g., a MsgB) of the two-step random access procedure, according to some embodiments.

In a 2-step random access procedure (RAP) for initial access, a first message, referred to as MsgA, may be transmitted by the UE, and a second message, referred to as MsgB, may be received by the UE. For example, as illustrated in FIG. 8, a user equipment (UE) 802 may transmit MsgA 806 to a base station 804 (e.g., a gNB of 5G NR). MsgA may include a preamble and a Physical Uplink Shared Channel (PUSCH), which includes a Common Control Channel (CCCH). The CCCH may include one or more Radio Resource Control (RRC) messages, e.g., messages such as RRC CONNECTION SETUP REQUEST, RRC CONNECTION REESTABLISHMENT REQUEST, RRC CONNECTION RESUME REQUST. In response to receiving MsgA, the gNB may transmit MsgB 808. Downlink control information (DCI) in a Physical Downlink Control Channel (PDCCH) schedules the MsgB in the Physical Downlink Shared Channel (PDSCH). MsgB may be realized by a scheduled MAC Protocol Data Unit (PDU) 809. (MAC is an acronym for Medium Access Control.) The gNB may scramble the DCI (or a Cyclic Redundancy Check of the DCI) with a MsgB-RNTI that is determined from resource location parameters of the received preamble. The DCI points to the MAC PDU, which contains random access response (RAR) information for the UE. The RAR information may include one or more of the following: timing advance, uplink grant(s), downlink grant(s), contention resolution id, and Radio Resource Control (RRC) message(s). The RRC message(s) is optional. If the UE 802 successfully receives MsgB 808, the UE may transmit an acknowledgement (ACK) to the gNB. However, if the UE 802 fails to receive MsgB 808, the UE may not transmit an acknowledgement to the gNB. The acknowledgement (ACK) may be an ACK of a Hybrid Automatic Repeat Request (HARQ) protocol.

The gNB 804 may perform a MsgB retransmission 810, e.g., in response to receive a negative acknowledgement from the UE. The MsgB retransmission may include DCI in a PDCCH and a MAC PDU retransmission 812, which may or may not be identical the original MAC PDU 809. If the UE successfully receives the MsgB retransmission 810, the UE may transmit an acknowledgement (ACK) 814 to the gNB.

Figure 9:
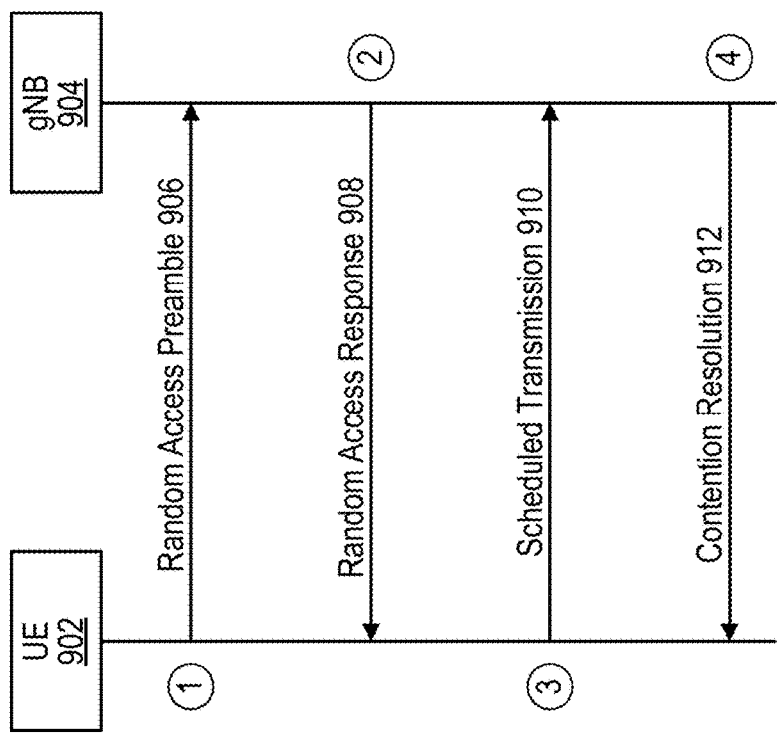
FIG. 9 illustrates an example of a four-step random access procedure, according to some embodiments.

In some embodiments, MsgA and MsgB may be related to messages of a 4-Step RAP as follows:

$$MsgA = Msg1 + Msg3$$
$$MsgB = Msg2 + Msg4,$$

where Msgk, k=1, 2, 3, 4, is the $k^{th}$ message of the 4-step random access procedure. An example of a 4-step random access procedure is illustrated in FIG. 9. In a first step (1), a user equipment (UE) 902 may transmit a random access preamble 906 to a base station (e.g., a gNB of 5G NR). In a second step (2), the gNB may transmit a random access response (RAR) message 908. The RAR message may include a grant of uplink resources for the next step. In a third step (3), the UE may perform a scheduled transmission 910, i.e., a transmission on uplink resources identified in the random access response 908. In a fourth step (4), the gNB may transmit a contention resolution message 912.

Figure 10:
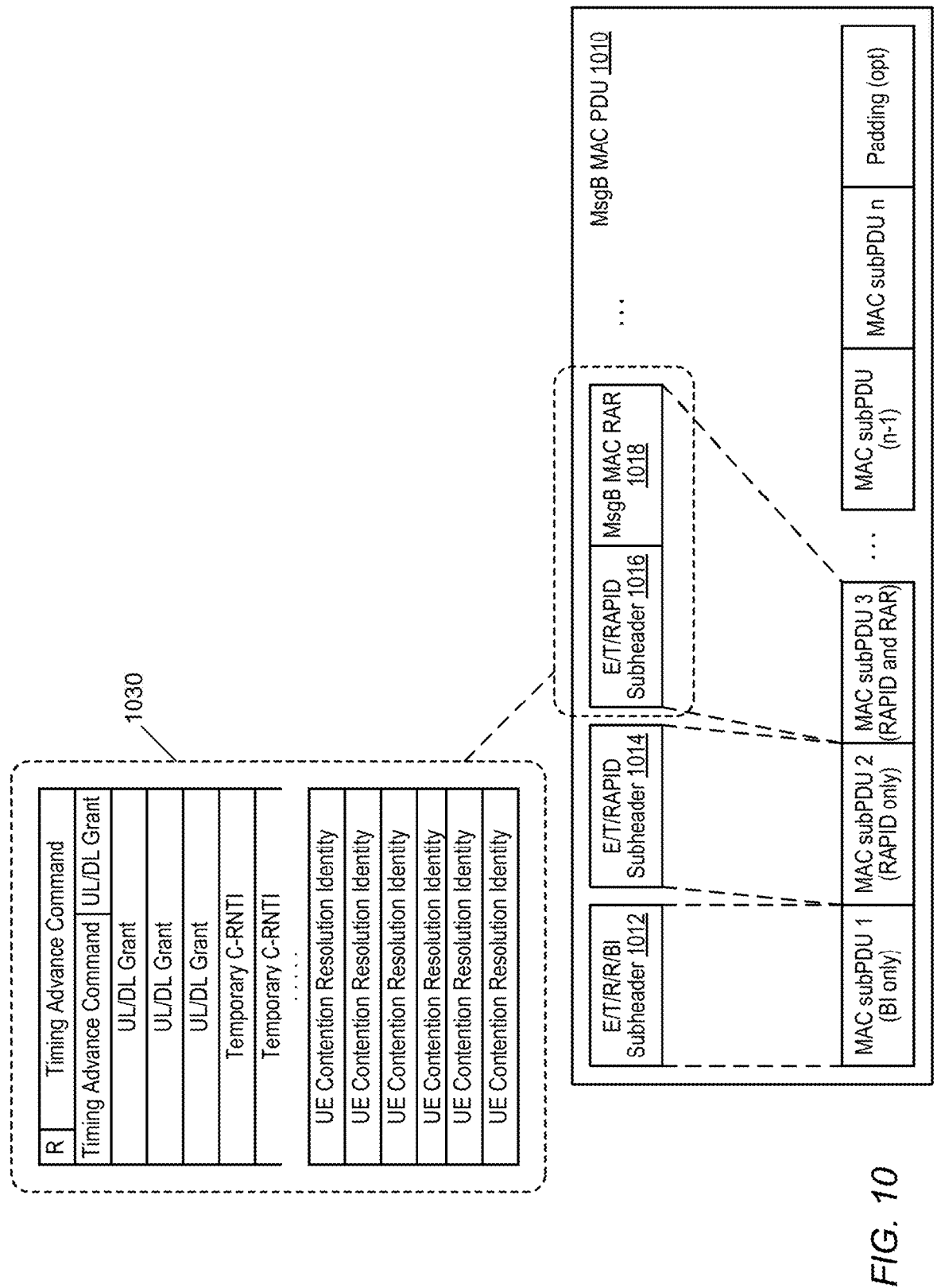
FIG. 10 illustrates an example of a MAC PDU (Medium Access Control Protocol Data Unit) corresponding to a downlink message (e.g., a MsgB) of a two-step random access procedure, according to some embodiments.

FIG. 10 illustrates an example of a MsgB MAC PDU 1010, i.e., a Medium Access Control Protocol Data Unit), according to some embodiments. The PDU 1010 includes a sequence of subPDUs, denoted subPDU1 through subP-DUn. Each subPDU may include information for a corresponding UE. The PDU may optionally include padding bits, e.g., at the end of the PDU. In the illustrated example, subPDU1 includes backoff indicator (BI), subPDU2 includes a Random Access Preamble Identifier (RAPID), subPDU3 includes a RAPID and a random access response (RAR). Each subPDU may include at least a corresponding subheader. SubPDU1 includes a subheader 1012, which may include E, T, R and BI fields. The E field is an extension flag indicating whether the subPDU is the last subPDU in the PDU. The T field is a type flag indicating whether the MAC subheader contains a RAPID or a backoff indicator. An R field is a reserved bit, which may be set to zero. SubPDU2 includes a subheader 1014, which may include E, T and RAPID fields. The RAPID field identifies a transmitted random access preamble. SubPDU3 includes a subheader 1016, which may include E, T and RAPID fields. SubPDU3 also includes a random access response 1018.

At 1030, an expanded view of subPDU3 is illustrated, according to some embodiments. The subPDU3 may include any combination of the following: one or more timing advance commands, one or more UL/DL grants, one or more temporary Cell Radio Network Temporary Identifiers (C-RNTIs), and one or more UE contention resolution identities. The specific numbers of each data type shown at 1013 are illustrative examples, and a wide variety of other combinations of number are possible.

MsgB-RNTI and MsgB Window Design

In response to receiving MsgA from a UE, the network (e.g., a base station such as a gNB of 5G NR) may transmit MsgB within a MsgB window that starts after the last symbol of the UE's preamble transmission. The UE knows the start time and duration of the window, and thus, knows when to monitor for the MsgB transmission. The network uses a Radio Network Temporary Identifier (RNTI) referred to as MsgB-RNTI to schedule MsgB within the MsgB window.

MsgB-RNTI may be unique within the MsgB window, and the mapping between MsgB-RNTI and the PRACH resource may be one to one. The UE may be required to monitor the PDCCH scrambled by the MsgB-RNTI for its MsgB reception (e.g., in some embodiments, the reception of the initial MsgB transmission) within the MsgB window. The MsgB-RNTI for monitoring may correspond to the PRACH resource used for the UE's preamble transmission.

In some embodiments, MsgB-RNTI design may be similar to RA-RNTI design for Msg2 in the 4-step random access procedure. (RA is an acronym for Random Access.) RA-RNTI design for Msg2 in 4-step RACH may involve the following formula for RA-RNTI calculation formula:

$$RA\text{-}RNTI = 1 + s\_id + 14 \times t\_id + 14 \times 80 \times f\_id + 14 \times 80 \times 8 \times ul\_carrier\_id,$$

where s_id, t_id, f_id, and ul_carrier_id are location parameters for the resource used to transmit the physical random access preamble. In some embodiments, s_id is the index of the first OFDM symbol of the PRACH occasion (0≤s_id<14); t_id is the index of the first slot of the PRACH occasion in a system frame (0≤t_id80); f_id is the index of the specified PRACH occasion in the frequency domain (0≤f_id<8); and ul_carrier_id is the uplink (UL) carrier used for Msg1 transmission (0 for NUL carrier, and 1 for SUL carrier). The random access response (RAR) window of the 4-step random access procedure may only consider one-shot transmission of Msg2 (i.e., not support retransmission of Msg2.)

Figure 11:
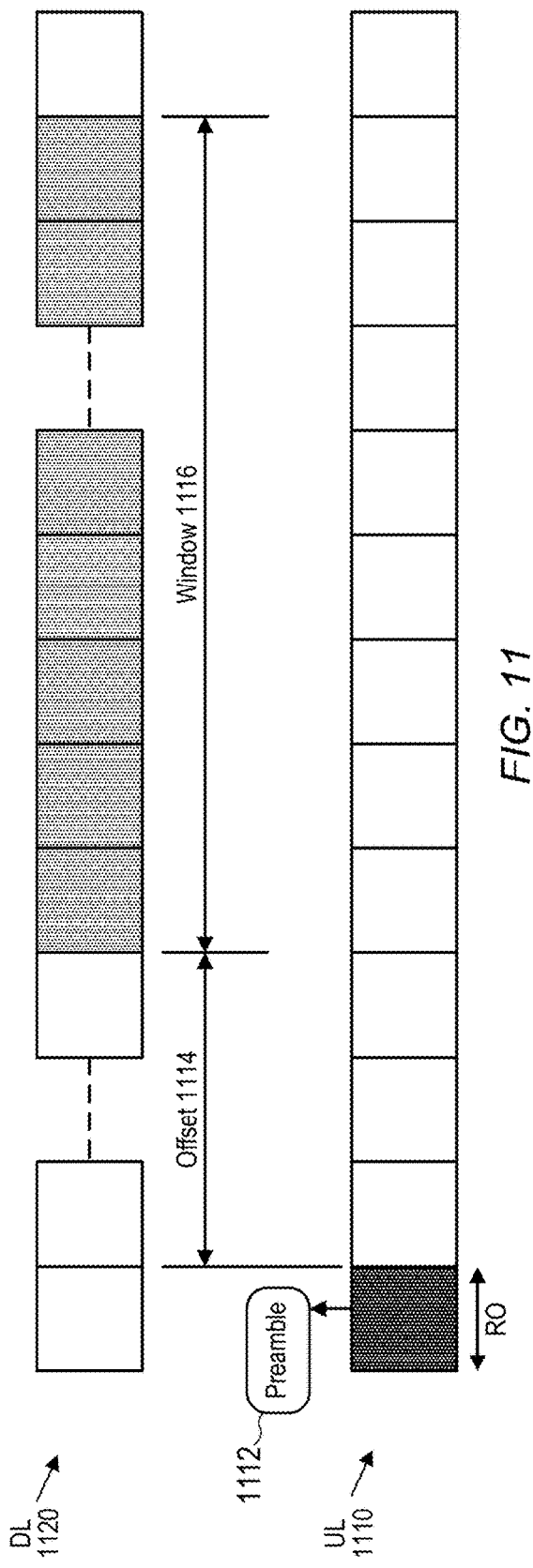
FIG. 11 illustrates an example of an uplink transmission (including a preamble) and a responsive downlink transmission, associated with a random access procedure, according to some embodiments.

In some embodiments, a user equipment (UE) may transmit a random access preamble 1112 during a random access opportunity (RO) in an uplink signal 1110, as shown in FIG. 11. In response to receiving the preamble, the gNB may start a window 1116 (e.g., a random access response window or a MsgB window) at an offset 1114 after an end of the preamble transmission. (The duration of the window may have a variety of different values in different embodiments. For example, in some embodiments, the window duration may be 10 ms.) The gNB may transmit a response message (e.g., a random access response or a MsgB) within the window, as part of downlink signal 1120.

Figure 12:
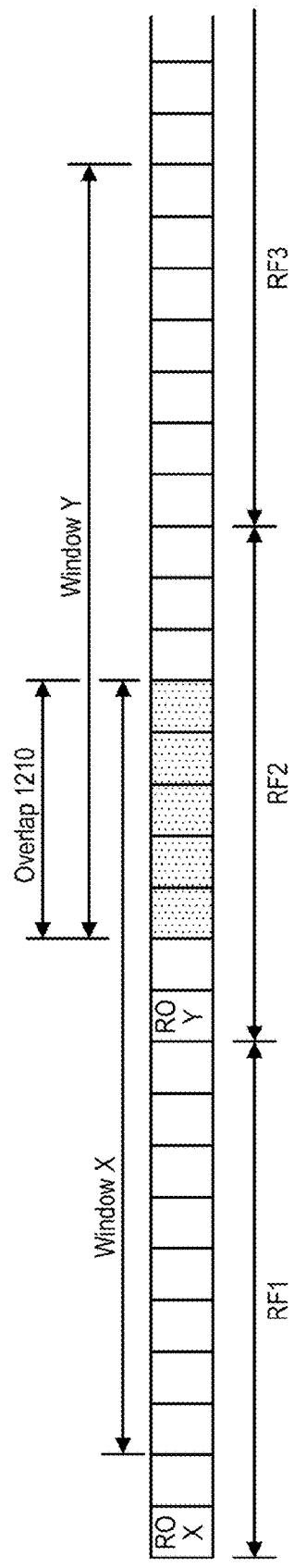
FIG. 12 illustrates an example of an overlap between monitoring windows corresponding to random access attempts by different user equipment devices, according to some embodiments.

As shown in FIG. 12, if two UEs use the same physical resources in different radio frames (of the sequence of radio frames RF1, RF2, RF3, . . . ) to transmit the same preamble (PRACH), and if the monitoring windows of the respective UEs overlap in time, an ambiguity regarding the response message (Msg2 or MsgB) may result. (PRACH is an acronym for Physical Random Access Channel, and is used as a synonym for random access preamble.) Each UE may assume that the response message is targeted for it whereas the response message was generated in response to only one of the PRACH transmissions. Thus, one of the UE's may receive and act upon response information that is relevant for another UE, but not relevant for it. For example, a first UE may transmit a PRACH during a random access opportunity RO X in a first radio frame RF1, which gives rise to monitoring window X. A second UE may transmit its PRACH during a random access opportunity RO Y in a second radio frame RF2, which gives rise to monitoring window Y. Because the physical resources are the same for RO X and RO Y, the network will calculate the same RA-RNTI (or MsgB-RNTI) for both UEs. Thus, if the network transmits a response message (Msg2 or MsgB) during the overlap region 1210, the response message is not addressed to a unique UE as the RA-RNTI (or MsgB-RNTI) is the same for both UEs.

If MsgB-RNTI is used for MsgB retransmission scheduling, in order to avoid the situation where a MsgB retransmission for UE1 and a MsgB initial transmission for UE2 being scheduled using same MsgB-RNTI at the same time, it may be desirable to introduce one or more enhancements in addition to RA-RNTI design.

MsgB Retransmission in 2-Step Random Access Procedure

In some embodiments, the UE may monitor MsgB transmission and retransmission during the whole MsgB reception period. The whole MsgB reception period may be used not only for initial transmission but also for retransmission(s) of MsgB. If the UE receives its MsgB and random access response (RAR) message, the UE may stop the MsgB reception process. The NW may perform MsgB transmission and retransmission during the MsgB reception period. The NW may perform MsgB retransmission based on the UE's ACK/NACK feedback. (ACK is an acronym for Acknowledgement; NACK is an acronym for Negative Acknowledgement.)

In some embodiments, the same MsgB-RNTI may be used for MsgB retransmission as for MsgB initial transmission; and a transmission number may be carried in the PDCCH or the MAC PDU of each MsgB transmission. (PDCCH is an acronym for Physical Downlink Control Channel. MAC is an acronym for Medium Access Control. PDU is an acronym for Protocol Data Unit.)

In some embodiments, the same MsgB-RNTI may be used for MsgB retransmission as for MsgB initial transmission; and the MsgB-window for MsgB-RNTI calculation may be extended to cover the period of MsgB retransmission(s).

In some embodiments, different MsgB-RNTIs may be used for successive MsgB transmissions.

In some embodiments, a retransmission of MsgB may include the whole MsgB MAC PDU. In other words, the MsgB MAC PDU may be the same for new transmission and retransmission.

In some embodiments, the network (e.g., gNB) may retransmit only the MAC subPDUs which the UEs have not received successfully, e.g., as indicated by their ACK/NACK feedback.

MsgB Transmissions with Included Transmission Number

In some embodiments, the network (e.g., a gNB of 5G NR) may use the same MsgB-RNTI for MsgB retransmission as it uses for the MsgB initial transmission. (The network may scramble downlink control information of in each MsgB transmission using the MsgB-RNTI.) Furthermore, each MsgB transmission may include a corresponding transmission number. The transmission number increments from one transmission to the next. The transmission number may be carried in the PDCCH or MsgB MAC PDU of the MsgB transmission.

The NW may configure two windows for the UE to use in connection with MsgB reception: a MsgB-window1; and a MsgB-window2 whose time duration is equal to Max_MsgBTxNumber times the time duration of MsgB-window1, $$|MsgB\text{-window2}| = |MsgB\text{-window1}| * \text{Max\_MsgBT} \times \text{Number},$$

where $|*|$ denotes the time duration of a window in suitable units, where Max_MsgBTxNumber is the maximum number of MsgB transmissions. (The parameter Max_MsgBTxNumber may be configured by the network, e.g., by RRC messaging to the UE.) Successive copies (i.e., Max_MsgBTxNumber copies) of MsgB-window1 are arranged within MsgB-window2. The NW may perform only one of the MsgB transmissions within each copy of window1. The MsgB-window2 and the first copy of MsgB-window1 for a given UE may start after the UE has transmitted its preamble, e.g., at least one OFDM symbol after the last OFDM symbol of the UE's PRACH transmission.

MsgB-RNTI may be calculated using a formula similar to the calculation formula for Msg2-RNTI, i.e., calculated using PRACH transmission resource information. For example, in some embodiments, MsgB-RNTI may be calculated using the following formula:

$$MsgB\text{-}RNTI = \\ 1 + s\_id + 14 \times t\_id + 14 \times 80 \times f\_id + 14 \times 80 \times 8 \times ul\_carrier\_id,$$

where the parameters s_id, t_id, f_id, and ul_carrier_id are as defined above. The network may employ this formula to determine the MsgB-RNTI from the parameter of a received preamble. The UE may employ this formula to determine the MsgB-RNTI from the parameters of a preamble transmission.

For each MsgB transmission (or each retransmission), the NW may indicate a current transmission number (or retransmission number) in MsgB, e.g., in the downlink control information (DCI) of the MsgB, or in the scheduled MAC PDU of the MsgB. The transmission number (or retransmission number) is different in different ones of the window1 copies because the network performs only one of the MsgB transmissions in any one of the copies.

In one embodiment, each transmission (among the initial transmission and retransmissions) may include a corresponding transmission number. The transmission number may start with zero (or any other convenient value) at the initial transmission, and increment with each retransmission. In another embodiment, each retransmission may include a corresponding transmission number. (The initial transmission may not include a transmission number.) The transmission number may start with zero (or any other convenient value) at the first retransmission, and increment with each following retransmission.

In some embodiments, the UE may accept or reject a MsgB transmission based on whether the transmission number of the MsgB transmission matches or fails to match the current window number. The UE may maintain a current window number n indicating that a current time resides within the $n^{th}$ copy of window1. The UE may change the current window number at the temporal boundaries between successive copies.

While monitoring the downlink signal during the $n^{th}$ copy of window 1, the UE may detect a MsgB transmission whose MsgB-RNTI matches an internally stored MsgB-RNTI, and whose transmission number is consistent with an $n^{th}$ MsgB transmission or $(n-1)^{st}$ MsgB retransmission. (The internally stored MsgB-RNTI may be the MsgB-RNTI corresponding to the location parameters of the UE's preamble transmission.) In this case, the UE may accept random access response (RAR) information included in the MsgB transmission, transmit a message acknowledging receipt of the MsgB transmission, and terminate MsgB monitoring.

While monitoring the downlink signal during the $n^{th}$ copy of window 1, the UE may detect a MsgB transmission whose MsgB-RNTI matches the internally-stored MsgB-RNTI, but whose transmission number is not consistent with an $n^{th}$ MsgB transmission or an $(n-1)^{st}$ MsgB retransmission. In this case, the UE may reject the MsgB transmission (e.g., make no attempt to decode RAR information included in the MsgB transmission), and continue the process of monitoring for MsgB transmission.

If a transmission number is carried in MsgB MAC PDU, it may be realized as a single indicator for all subPDUs within the MAC PDU, or alternatively, as a separate indicator for each subPDU within the MAC PDU. Each subPDU may carry information for a corresponding user equipment device.

In some embodiments, if a transmission number is carried for each MAC subPDU, one MsgB MAC PDU may include the MAC subPDUs with different transmission number.

The UE may monitor MsgB transmissions (initial transmission and retransmissions) within the MsgB-window2. If the end of the MsgB-window2 is reached without successful MsgB reception, the UE may conclude that the random access attempt has failed.

Figure 13:
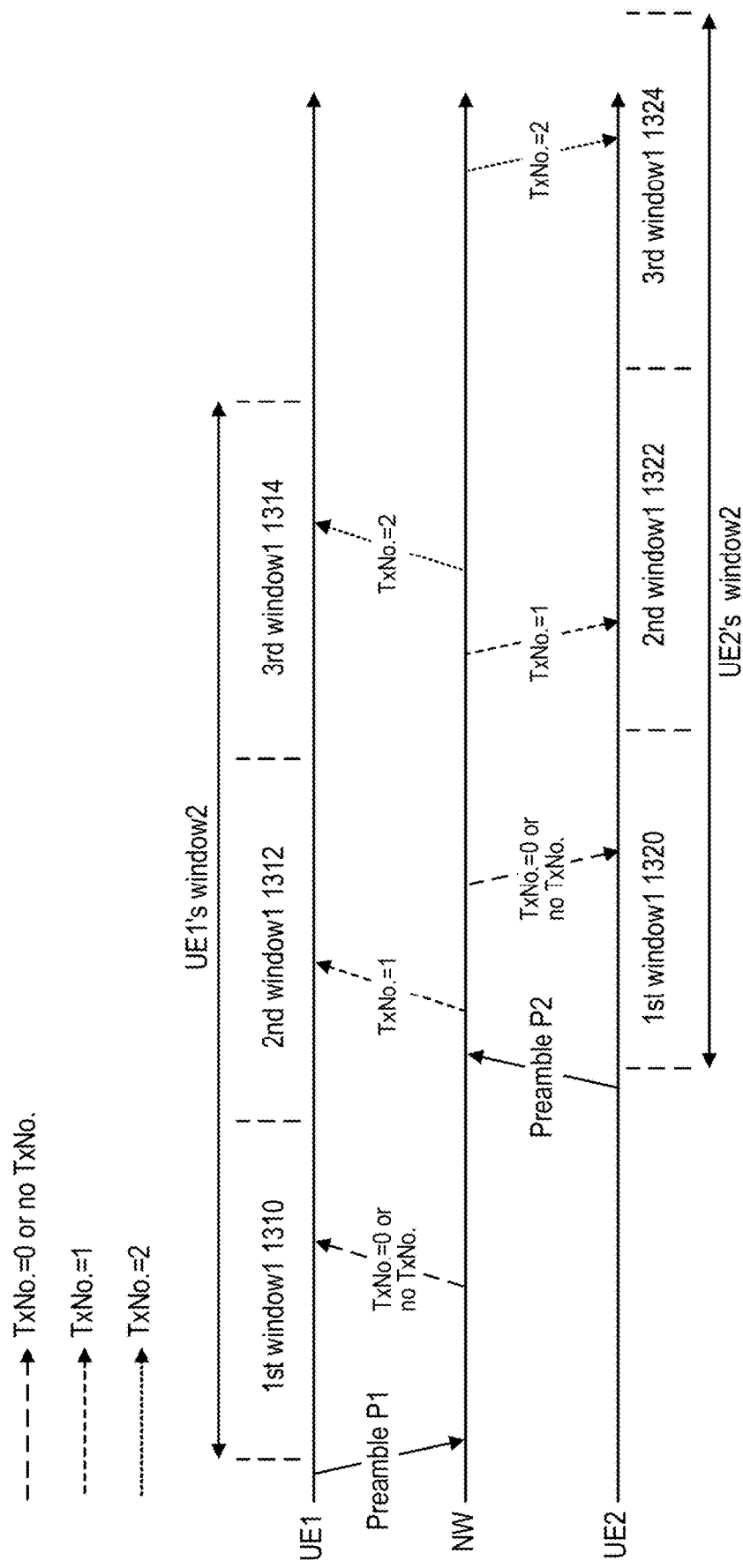
FIG. 13 illustrates an example of a method for performing retransmission(s) of a random access message with included transmission number(s), according to some embodiments.

FIG. 13: An Example with Maximum MsgB Transmission Number=3

Referring now to FIG. 13, suppose that UE1 and UE2 transmit respectively preambles P1 and P2 (where P1 and P2 may be the same or different) to the network NW using the same PRACH resource in different radio frames, but the preamble transmission of UE2 occurs after the end of UE1's first window1 1310, e.g., in UE1's second window1 1312. Thus, UE1 and UE2 attempt to decode MsgB control information in the Physical Downlink Control Channel (PDCCH) with the same MsgB-RNTI. In the 2nd window1 of UE1, UE1 will be responsive only to a MsgB transmission with transmit number (TxNo.) equal to 1. In the 1st window1 1320 of UE2, which overlaps with the 2nd window1 of UEL, UE2 will be responsive only to a MsgB transmission with transmit number equal to zero (or without any TxNo information). If UE1 cannot receive its MsgB (which includes the random access response for UE1) during its 3rd window1 1314, UE1 may conclude that the random access procedure has failed. In the 2nd window 1 1322 of UE2, if UE2 receives its MsgB (which includes the random access response for UE2), UE2 may conclude that MsgB reception has succeeded and stop the MsgB reception process. In the illustrated example, the maximum MsgB transmission number is set to three. Thus, UE1's window2 includes three successive copies (1320, 1312, 1314) of window1, and UE2's window 2 similarly includes three successive copies (1320, 1322, 1324) of window1. However, it should be understood that the maximum MsgB transmission number make take any of a wide variety of values, e.g., depending on factors such as application context, signal to interference-and-noise ratio (SINR), device capabilities, etc.

Extended Window for MsgB-RNTI Calculation

In some embodiments, the same MsgB-RNTI may be used for MsgB retransmission as for the MsgB initial transmission, and the MsgB window for MsgB-RNTI calculation may be extended in time to cover the initial MsgB transmission and the one or more MsgB retransmissions. For example, in some embodiments, the MsgB window may have a time duration greater than 10 ms.

The NW may configure a time duration for the MsgB-window that is sufficiently large to cover the initial MsgB transmission and one or more MsgB retransmissions. The MsgB window may start after the UE's preamble transmission, e.g., at least one OFDM symbol after the last OFDM symbol of the UE's PRACH transmission. (PRACH is an acronym for Physical Random Access Channel.)

The MsgB-RNTI may be calculated using a formula similar to the calculation formula for Msg2-RNTI (based on PRACH resource information), e.g., using the following formula:

$$MsgB-RNTI = 1 + \text{s\_id} + 14 \times \text{t\_id} + 14 \times \text{MAX(t\_id)} \times \text{f\_id} + 14 \times \text{MAX(t\_id)} \times 8 \times \text{ul\_carrier\_id},$$

wherein the parameters s_id, f_id, and ul_carrier_id are as defined above. The parameter t_id is a slot index, where $0 \leq \text{t\_id} < \text{MAX(t\_id)}$, wherein MAX(t_id) is the number of slots in the MsgB window. In some embodiments, the parameter MAX(t_id) may be configured by the network, e.g., by RRC messaging to the UE. The above formula may be used by the NW to calculate the MsgB-RNTI from the parameters of the preamble received from the UE. The above formula may also be used by the UE to calculate the MsgB-RNTI corresponding to a transmission of the preamble. The UE may save the calculated MsgB-RNTI in memory to use when attempting to decode the downlink control information (DCI) in each MsgB transmission.

The NW may perform initial MsgB transmission and one or more MsgB retransmissions within the same MsgB window. The UE may monitor for MsgB transmissions within the MsgB window.

Figure 14:
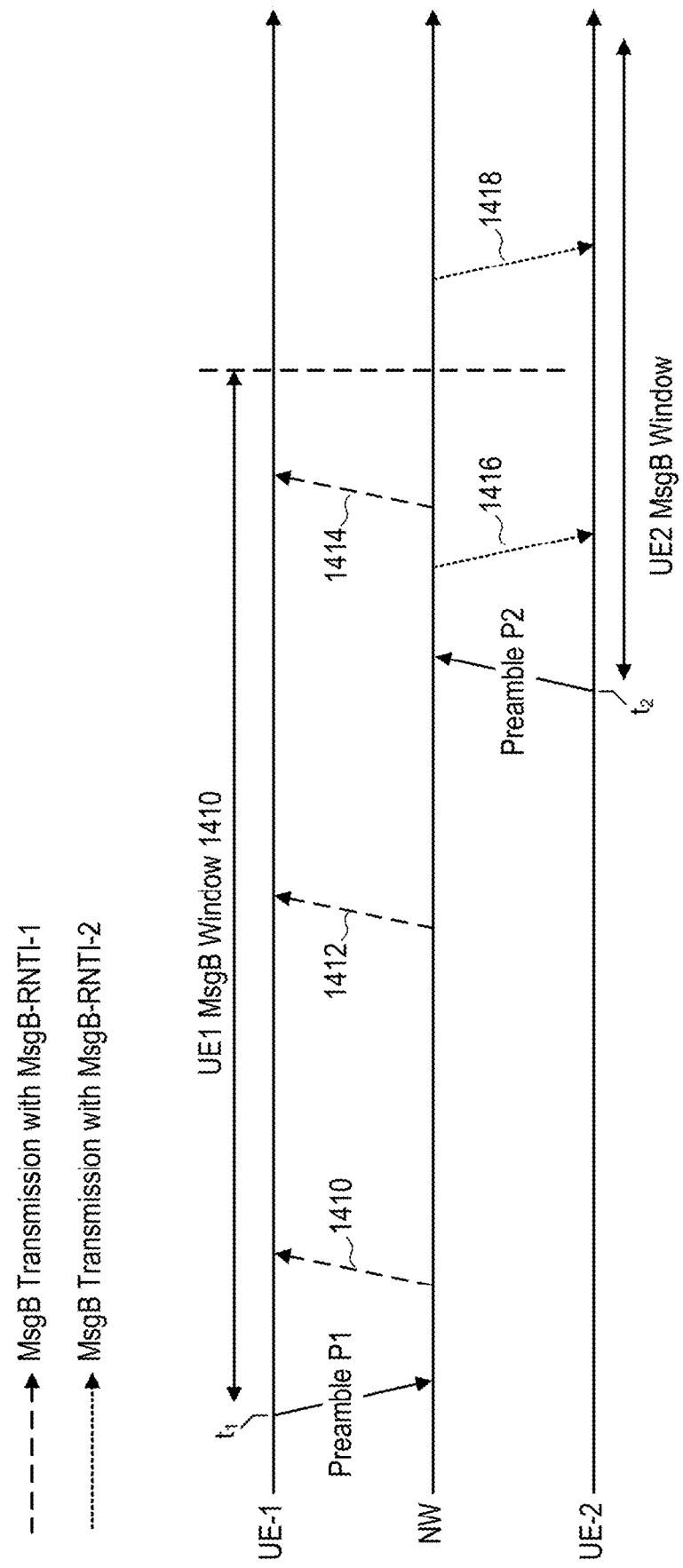
FIG. 14 illustrates an example of a method for performing retransmission(s) of a random access downlink message using an extended window for calculation of a Radio Network Temporary Identity (RA) associated with the downlink message, according to some embodiments.

As an example, suppose that UE1 and UE2 use different PRACH resources to respectively transmit preambles P1 and P2 (where P1 and P2 may be the same or different preambles), but that the time difference $t_2-t_1$ between UE2's preamble transmission time $t_2$ and UE1's preamble transmission time $t_1$ is non-zero and less than the time duration of the MsgB window 1410 (i.e., UE1's MsgB window), as illustrated in FIG. 14. Thus, UE1 and UE2 have different MsgB-RNTIs for MsgB reception, and the MsgB-RNTI calculation at the network can distinguish the two RACH occasions for UE1 and UE2, respectively. (RACH is acronym for Random Access Channel, and is a synonym for Random Access.) The network (NW) may perform retransmission(s) of UE1's MsgB using a first MsgB-RNTI, denoted MsgB-RNTI1. Three such transmissions (1410, 1412 and 1414) are illustrated. The network may also perform retransmission(s) of UE2's MsgB using a second MsgB-RNTI, denoted MsgB-RNTI2. Two such transmissions (1416 and 1418) are illustrated. It may be observed that the conditional probability that $t_2-t_1$ is equal to zero given that $t_2-t_1$ is less than the time duration of the MsgB window is inversely related to the time duration of the MsgB window. Thus, by extending the MsgB window duration to provide time for the initial MsgB transmission and one or more retransmissions, it becomes very likely that the preamble transmission of UE2 will have a different MsgB-RNTI than the preamble transmission of UE1.

Different MsgB-RNTIs for Different Transmissions of MsgB

In some embodiments, in response to receiving a preamble from a UE, the network (e.g., the gNB of 5G NR) may perform a plurality of transmissions of the MsgB, with each transmission using a different MsgB-RNTI to scramble the downlink control information (DCI) of the MsgB. For example, the initial MsgB transmission may use one MsgB-RNTI, and the first MsgB retransmission may use a different MsgB-RNTI.

The NW may configure two windows for the UE to use in connection with MsgB reception: a MsgB-window1; and a MsgB-window2 whose time duration is equal to Max_MsgBTxNumber times the time duration of MsgB-window1, $$|MsgB-\text{window2}| = |MsgB-\text{window1}| * \text{Max\_MsgBT} \times \text{Number},$$

where $|*|$ denotes the time duration of a window in suitable units, where Max_MsgBTxNumber is the maximum number of MsgB transmissions. (The parameter Max_MsgBTxNumber may be configured by the network, e.g., via RRC messaging to the UE.) Successive copies (i.e., Max_MsgBTxNumber copies) of MsgB-window1 are arranged within MsgB-window2. The NW (e.g., the base station) may perform only one of the MsgB transmissions relative to a given UE within each copy of the UE's window1. The MsgB-window2 and the first copy of MsgB-window1 may start after the UE has transmitted its preamble, e.g., at least one OFDM symbol after the last OFDM symbol of the UE's PRACH transmission.

In some embodiments, the MsgB-RNTI associated with the UE's preamble transmission and the network's initial MsgB transmission may be calculated using a formula similar to the calculation formula for Msg2-RNTI (using PRACH resource info), e.g., using the formula:

$$MsgB-RNTI = $$
$$1 + \text{s\_id} + 14 \times \text{t\_id} + 14 \times 80 \times \text{f\_id} + 14 \times 80 \times 8 \times \text{ul\_carrier\_id},$$

wherein the parameters s_id, t_id, f_id, and ul_carrier_id are as defined above.

More generally, for the $n^{th}$ transmission of MsgB, the network may use a corresponding RNTI, denoted MB-RNTI-Rn, to scramble the DCI (or the Cyclic Redundancy Check of the DCI) of the MsgB. For example, MB-RNTI-R0 may be used for the initial transmission; MB-RNTI-R1 may be used for the 1st retransmission; MB-RNTI-R2 may be used for 2nd retransmission; and so on.

In some embodiments, the calculation of MB-RNTI-Rn for the $n^{th}$ transmission of MsgB may be based on a formula such as:

$$MsgB-RNTI-Rn = 1 + \text{s\_id} + 14 \times \text{t\_id} +$$
$$14 \times 80 \times \text{f\_id} + 14 \times 80 \times 8 \times \text{ul\_carrier\_id} + 14 \times 80 \times 8 \times 2 * n,$$

where s_id, t_id, f_id, and ul_carrier_id are as defined above, where $0 \leq n \leq n_{MR}-1$, where $n_{MR}$ is the maximum number of transmissions. Note that the formula includes the MsgB-RNTI formula as a special case, i.e., when n=0.

The UE may monitor for MsgB transmissions within MsgB-window2. In the first copy of window1, the UE may monitor for the initial MsgB transmission with MsgB-RNTI. In the second copy of window1, the UE may monitor for the first MsgB retransmission using MB-RNTI-R1. In the $(n+1)^{th}$ copy of window 1, the UE may monitor for the $n^{th}$ MsgB retransmission using MB-RNTI-Rn.

In the nth copy of window1, the UE may attempt to receive the nth MsgB transmission by decoding downlink control information (DCI) in the Physical Downlink Control Channel (PDCCH) of a downlink signal using MB-RNTI-Rn. If the decode attempt is successful, the UE may access random access response (RAR) information in a data payload (e.g., a MAC PDU) scheduled by the DCI, send a message acknowledging successful receipt of MsgB, and terminate monitoring for MsgB. Alternatively, if the decode attempt is unsuccessful, the UE may continue monitoring for MsgB. If the UE has not been successfully received MsgB by the end of window2, the UE may conclude that the random access procedure has failed.

Figure 15:
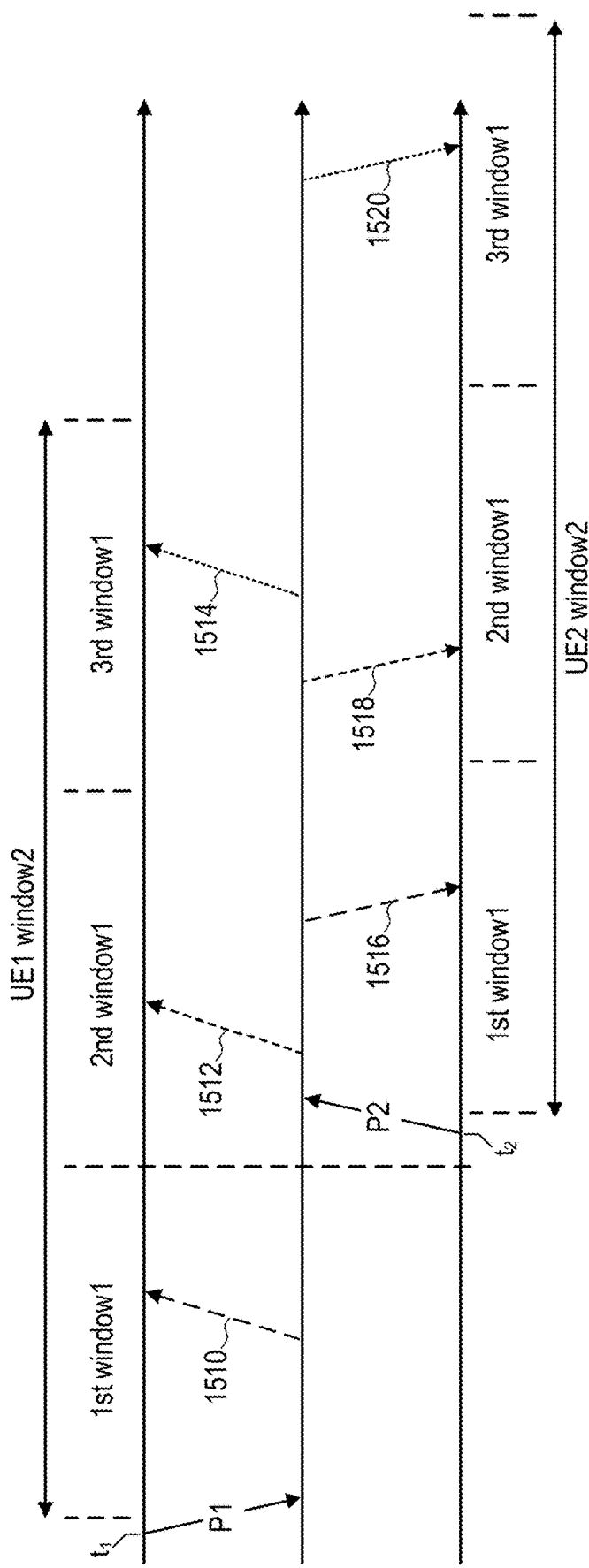
FIG. 15 illustrates an example of a method for performing successive transmissions (or retransmission) of a random access downlink message using different Radio Network Temporary Identities, according to some embodiments.

FIG. 15 illustrates an example of use of different MsgB-RNTIs in connection with successive MsgB transmissions (or retransmissions). UE1 may transmit a preamble P1 at time $t_1$, and receive up to three transmissions (1510, 1512 and 1514) of a $MsgB^{UE1}$, using respectively MsgB-RNTI, MB-RNTI1 and MB-RNTI2. UE2 may transmit a preamble P1 (same as or different from preamble P1) using a physical resource having the same resource location parameters as UE1's preamble transmission, but the time $t_2$ of UE2's preamble transmission occurs after the end of UE1's $1^{st}$ window 1, e.g., in UE1's $2^{nd}$ window 1. Thus, even though MsgB transmissions 1512 and 1516 both occur within UE2's $1^{st}$ window 1, UE2 will be able to reject MsgB transmission 1512 (which is targeted for UE1) and accept MsgB transmission 1516 based on their distinct RNTIs. Transmission 1512 is an first retransmission, and thus, will use MB-RNTI1. In contrast, transmission 1516 is an initial transmission, and thus, will use MsgB-RNTI. UE2 knows to use MsgB-RNTI for control information decoding in its $1^{st}$ window1, not MB-RNTI1. UE2 may receive up to three transmissions (1516, 1518 and 1520) of $MsgB^{UE2}$ using respectively MsgB-RNTI, MB-RNTI1 and MB-RNTI2.

Content for MsgB MAC PDU for Retransmission

Figure 16:
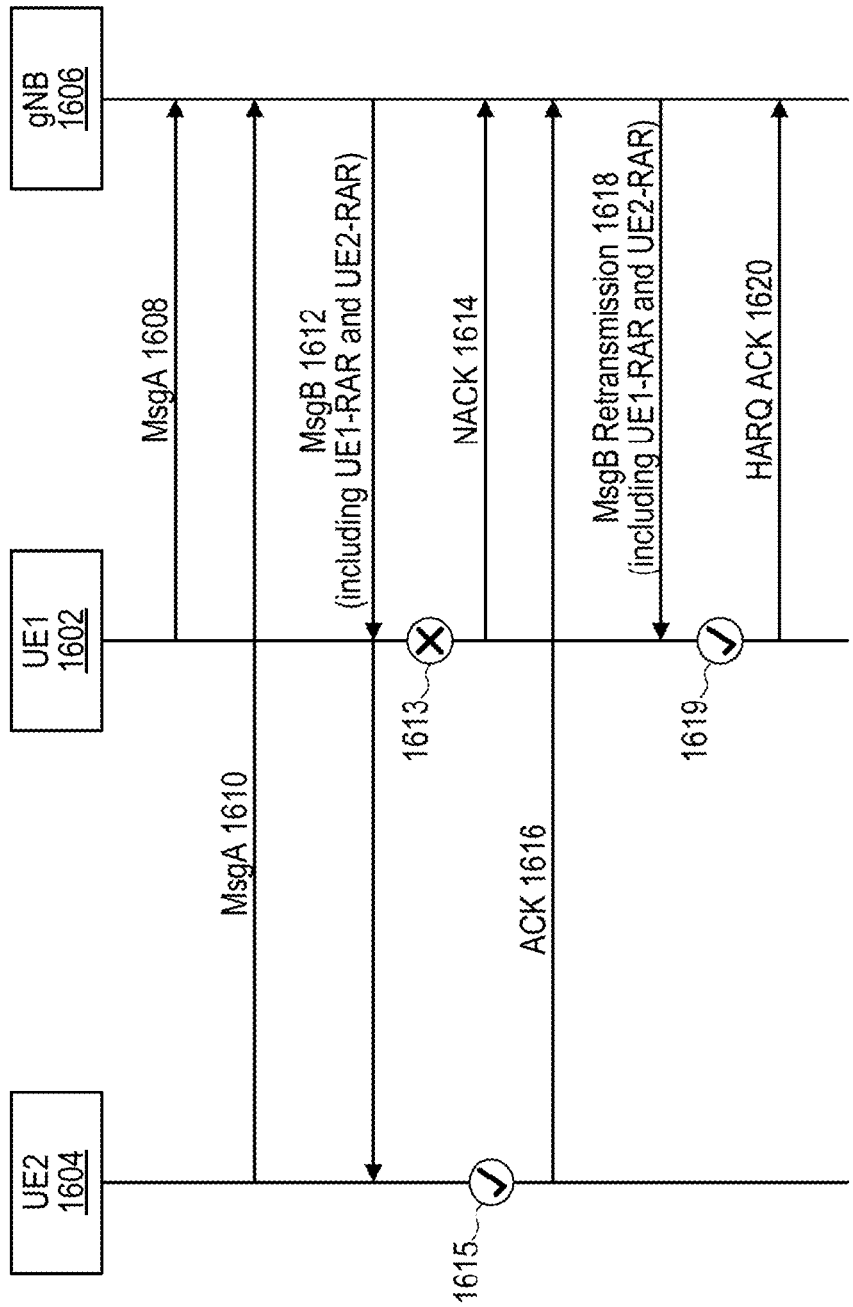
FIG. 16 illustrates an example of a method where successive transmissions of a random access downlink message contain the same set of UE-specific payloads, according to some embodiments.

In some embodiments, the network may include the whole MsgB MAC PDU in each retransmission of MsgB, i.e., the same MsgB MAC PDU as included in the initial MsgB transmission. The NW may retransmit the MsgB PDU with all MAC subPDUs. For example, as shown in FIG. 16, a first UE 1602 may transmit MsgA 1608 to a base station 1606 (e.g., a gNB of 5G NR) as part of a two-step random access procedure. Similarly, a second UE 1604 may transmit MsgB 1610 to the base station. In response to the transmissions 1608 and 1610, the gNB may transmit MsgB 1612 including UE1-RAR (i.e., a random access response for the first UE) and UE2-RAR (i.e., a random access response for the second UE). The first UE fails to receive the MsgB 1612, as indicated at 1613, and thus, sends a negative acknowledgement (NACK) 1614 to the gNB. In contrast, the second UE successfully receives the UE2 RAR from the MsgB 1612, as indicated at 1615, and thus, sends an acknowledgement (ACK) 1616 to the gNB. In response to the NACK 1614 and ACK 1616, the gNB may perform MsgB retransmission 1618 including the UE1-RAR and UE2-RAR. The first UE may then successfully receive the UE1-RAR from the MsgB retransmission, as indicated at 1619, and transmit a HARQ ACK to the gNB. (HARQ is an acronym for Hybrid Automatic Repeat Request.)

Figure 17:
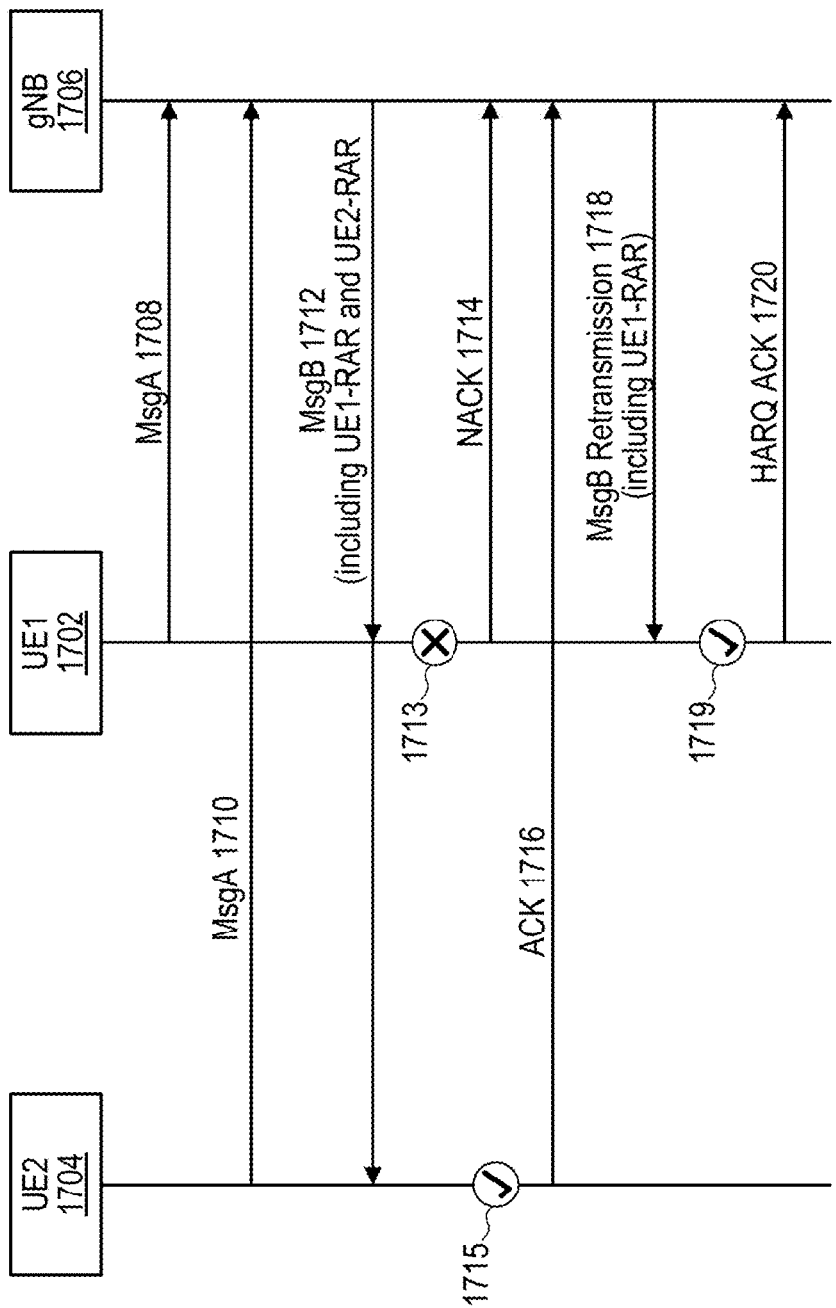
FIG. 17 illustrates an example of a method where successive transmissions of a random access downlink message contain a decreasing set of UE-specific payloads over time, according to some embodiments.

In some embodiments, the network may include in a retransmitted MsgB MAC PDU only those MAC subPDUs not received successfully by the UEs. If the NW receives an ACK (i.e., an acknowledgement message) from a UE, the NW may not include that UE's MAC subPDU (including RAR and/or RRC message) in the next retransmitted MsgB MAC PDU. For example, as shown in FIG. 17, a first UE 1702 may transmit a MsgA 1708 to a base station 1706 (e.g., a gNB of 5G NR) as part of a two-step random access procedure. A second UE 1704 may transmit a MsgA 1710 to the base station. In response to the transmissions 1708 and 1710, the gNB may transmit MsgB 1712 including UE1-RAR and UE2-RAR. The first UE may fail to receive the MsgB transmission 1712, as indicated at 1713, and thus, may transmit a negative acknowledgement (NACK) 1714. In contrast, the second UE may successfully receive the UE2-RAR contained in the MsgB 1712, as indicated at 1715, and thus, may transmit an acknowledgement (ACK) 1716. In response to the NACK 1714 and the ACK 1716, the gNB may perform MsgB retransmission 1718. The MsgB retransmission may include the UE1-RAR but not the UE2-RAR. The first UE may successfully receive the UE1-RAR from the MsgB retransmission 1718, and thus, may transmit a HARQ ACK 1720.

FIGS. 18 and 19—Retransmission of Downlink Message in Random Access Process

In some embodiments, a method 1800 for operating a wireless user equipment (UE) device may include the operations shown in FIG. 18. (The method 1800 may also include any subset of the elements, embodiments and features described above in connection with FIGS. 1-17.) The UE device may be configured as variously described above, e.g., as described in connection with user equipment 600 of FIG. 6. The method 1800 may be performed by a processing element of the UE device.

At 1810, after failing to receive an initial transmission of a downlink message from a base station, the processing element may monitor for one or more retransmissions of the downlink message, where the downlink message is part of a two-step random access procedure. For example, the downlink message may be realized by the MsgB as variously described above.

In some embodiments, the action of monitoring includes attempting to decode control information in a first of the one or more retransmissions using a Radio Network Temporary Identity (RNTI) that was previously used by the UE device to attempt decoding of control information in the initial transmission. The RNTI may be based on location parameters of a physical uplink resource that was used by the UE device to transmit a random access preamble. (The preamble may be transmitted as part of a MsgA of the two-step random access procedure. The base station may perform the initial transmission and the one or more retransmissions of the downlink message in response to receiving the preamble transmission from the UE device.)

In some embodiments, the action of monitoring includes: recovering (or attempting to recover) a transmission number from the first retransmission of the downlink message; and comparing the transmission number with a current window number of the UE device in order to determine whether the first retransmission includes random access response (RAR) information targeted for the UE device. (The base station may include a different transmission number in each of the one or more retransmissions of the downlink message.) If the numbers match (e.g., are equal), the monitoring may further include recovering the RAR information from the first retransmission. If the numbers do not match, the monitoring may include recovering (or attempting to recover) a second transmission number from a second retransmission of the downlink message.

In some embodiments, the transmission number is included in a Physical Downlink Control Channel (PDCCH) or a Medium Access Control Protocol Data Unit (MAC PDU) of the first retransmission. For example, the transmission number may be included in downlink control information (DCI) embedded in the PDCCH.

In some embodiments, the processing element may receive a configuration message from the base station prior to performing said monitoring. The configuration message may indicate a time duration of a window for said monitoring. The time duration may be sufficiently large to include up to N transmissions of the downlink message, wherein N is greater than one. The N transmissions may include at least the initial transmission and the one or more retransmissions. The window may start after the UE device transmits a random access preamble to the base station.

In some embodiments, the processing element may calculate a Radio Network Temporary Identity (RNTI) based on locations parameters of a preamble transmission. The calculation may be based on a formula (or table or algorithm) that maps distinct preamble transmission times, differing by less than the time duration, to distinct values of RNTI. The calculated RNTI may be used to de-scramble (or, to attempt the de-scrambling of) control information in the first retransmission or the initial transmission of the downlink message.

In some embodiments, said monitoring includes attempting to decode control information in a first of the one or more retransmissions using a Radio Network Temporary Identity (RNTI) that is different from an RNTI that was used to attempt decoding of the initial transmission, e.g., as variously described above.

In some embodiments, the RNTI used to attempt decoding of the first retransmission depends at least in part on a window number in which the first retransmission in received. The window number may correspond to a number of window numbers between the time of the decoding attempt and the start time of said monitoring.

In some embodiments, the initial transmission of the downlink message includes data portions targeted respectively to UE devices including the UE device of method 1800. The data portions may include respective random access response (RAR) messages. The first retransmission also include those data portions. Alternatively, the first retransmission may include a proper subset of the data portions, where the proper subset includes a given data portion that is targeted for said UE device. A data portions that has been successfully received by another UE device may not be included first retransmission.

In some embodiments, the processing element may transmit an acknowledge message to the base station in response to successfully receiving the first retransmission.

In some embodiments, the downlink message may include at least one grant of uplink transmission resources and at least one contention resolution identity.

In some embodiments, a method 1900 for operating a wireless base station may include the operations shown in FIG. 19. (The method 1900 may also include any subset of the elements, embodiments and features described above in connection with FIGS. 1-18.) The base station may be configured as variously described above, e.g., as described in connection with base station 700 of FIG. 7. The method 1900 may be performed by a processing element of the base station.

At 1910, after determining that an initial transmission of a downlink message to a user equipment device has failed (e.g., by virtue of having received a negative acknowledgement from the user equipment device), the processing element may perform one or more retransmissions of the downlink message, wherein the downlink message is part of a two-step random access procedure.

In some embodiments, the action of performing one or more retransmissions of the downlink message may include embedding a transmission number in each of the one or more retransmissions, e.g., as variously described above.

In some embodiments, the processing element may transmit a configuration message (e.g., a Radio Resource Control message) to the user equipment device, where the configuration message indicates a time duration of a monitoring window. The time duration may be sufficiently large to include up to N transmissions of the downlink message, wherein N is greater than one. The N transmissions may include the initial transmission and the one or more retransmissions.

In some embodiments, the processing element may calculate a Radio Network Temporary Identity (RNTI) based on locations parameters of a received preamble, wherein said calculating is based on formula that maps distinct preamble transmission times, differing by less than the above described time duration, to distinct values of RNTI. The RNTI may be used to scramble downlink control information in the initial transmission and the one or more retransmissions of the downlink message.

In some embodiments, the action of performing one or more retransmission of the downlink message may include scrambling control information in a first of the one or more retransmissions using a Radio Network Temporary Identity (RNTI) that is different from an RNTI that was used to scramble control information in the initial transmission.

Additional Embodiments

In some embodiments, a method for operating a wireless user equipment (UE) device may comprise performing operations on a processing element, wherein the operations. The operations may include monitoring a downlink signal for a MsgB transmission and one or more MsgB retransmissions by a base station, wherein the MsgB is part of a two-step random access procedure.

In some embodiments, a base station may performs the MsgB transmission and/or retransmission(s) during a MsgB window.

In some embodiments, MsgB includes at least one contention resolution ID and at least one grant of resources for uplink transmission and/or downlink transmission.

In some embodiments, the same MsgB-RNTI may be used for the MsgB retransmission(s) as for the MsgB transmission, wherein a transmission number is carried in the MsgB retransmission(s).

In some embodiments, the same MsgB-RNTI may be used for the MsgB retransmission(s) as for the MsgB transmission, wherein a MsgB window for calculation of the MsgB-RNTI (Radio Network Temporary Identifier) is extended to cover a retransmission period.

In some embodiments, different MsgB-RNTIs may be used for MsgB transmission and MsgB retransmission(s).

In some embodiments, each MsgB retransmission may include the same MsgB MAC PDU (Medium Access Control Protocol Data Unit) as the MsgB transmission.

In some embodiments, each MsgB retransmission includes only MAC sub-PDUs that have not be successfully received.

In some embodiments, a method for operating a wireless user equipment (UE) device may comprise performing operations on a processing element. The operations include: transmitting a random access preamble using a selected physical random access resource; and after failing to receive a transmission of a MsgB from a base station, monitoring a downlink signal for one or more MsgB retransmissions by the base station, wherein the MsgB is part of a two-step random access procedure.

In some embodiments, at least one of the retransmissions is scheduled using a random access RNTI that is based on the selected physical random access resource.

In some embodiments, at least one of the retransmissions is scheduled using a random access RNTI that is based on the selected physical random access resource and a number of transmissions or retransmissions of the MsgB.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE) device, a tablet computer, a wearable computer, etc.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method, comprising:
   receiving a configuration message from a base station, wherein the configuration message indicates a time duration of a window for monitoring for a random access response (RAR) message;
   monitoring for one or more transmissions of the RAR message, wherein the one or more transmissions of the RAR message are part of a two-step random access procedure;
   receiving downlink control information (DCI) in a first of the one or more transmissions of the RAR message within the window using a message B (MSGB) Radio Network Temporary Identity (RNTI), wherein the MSGB-RNTI is associated with location parameters of a physical uplink resource that was used to transmit a random access preamble of the two-step random access procedure; and
   determining, based at least in part on a field in the DCI indicating a time sub-window number, that the DCI is intended for a user equipment (UE) that transmitted the random access preamble and to decode the one or more transmissions.

2. The method of claim 1, wherein the time sub-window number is associated with a time of transmission of the random access preamble.

3. The method of claim 1, wherein the time sub-window number resolves DCI transmissions relating to random access preamble transmissions in different radio frames using a same MSGB-RNTI.

4. The method of claim 1, wherein the window for monitoring for the RAR message is larger than a sub-window.

5. The method of claim 1, wherein said monitoring includes:
   recovering a transmission number from the first of the one or more transmissions; and
   comparing the transmission number with a current window number of a user equipment (UE) in order to determine whether the first of the one or more transmissions includes RAR information targeted for the UE.

6. The method of claim 1, wherein the time duration is sufficiently large to include up to N transmissions of the RAR message, and wherein N is greater than one.

7. The method of claim 1, further comprising:
   transmitting, in response to successfully receiving the first of the one or more transmissions, an acknowledge message.

8. The method of claim 1, wherein the RAR message includes at least one grant of transmission resources and at least one contention resolution identity.

9. An apparatus, comprising:
   a processor configured to, when executing instructions stored in a memory, perform operations comprising:
   receiving a configuration message from a base station, wherein the configuration message indicates a time duration of a window for monitoring for a random access response (RAR) message;
   monitoring for one or more transmissions of the RAR message, wherein the one or more transmissions of the RAR message are part of a two-step random access procedure;
   receiving downlink control information (DCI) in a first of the one or more transmissions of the RAR message within the window using a message B (MSGB) Radio Network Temporary Identity (RNTI), wherein the MSGB-RNTI is associated with location parameters of a physical uplink resource that was used to transmit a random access preamble of the two-step random access procedure; and
   determining, based at least in part on a field in the DCI indicating a sub-window number, that the DCI is intended for the UE that transmitted the random access preamble and to decode the one or more transmissions.

10. The apparatus of claim 9, wherein the time sub-window number resolves DCI transmissions relating to random access preamble transmissions in different radio frames using a same MSGB-RNTI.

11. The apparatus of claim 10, wherein the time sub-window number is associated with a time of transmission of the random access preamble.

12. The apparatus of claim 9, wherein the time sub-window number is associated with a time of the random access preamble transmission.

13. The apparatus of claim 9, wherein, as part of the monitoring, the operations further comprise:
    recovering a transmission number from the first of the one or more transmissions; and
    comparing the transmission number with a current window number of the UE in order to determine whether the first of the one or more transmissions includes RAR information targeted for the UE.

14. The apparatus of claim 9, wherein the RAR message includes at least one grant of transmission resources and at least one contention resolution identity.

15. The apparatus of claim 9, further comprising:
    a radio operably coupled to the processor.

16. A baseband processor, comprising:
    memory storing instructions that, when executed, cause a user equipment (UE) to:
    receive a configuration message from a base station, wherein the configuration message indicates a time duration of a window for monitoring for a random access response (RAR) message;
    monitor for one or more transmissions of the RAR message, wherein the one or more transmissions of the RAR message are part of a two-step random access procedure;
    receive downlink control information (DCI) in a first of the one or more transmissions of the RAR message within the window using a message B (MSGB) Radio Network Temporary Identity (RNTI), wherein the MSGB-RNTI is associated with location parameters of a physical uplink resource that was used to transmit a random access preamble of the two-step random access procedure; and
    determine, based at least in part on a field in the DCI indicating a time sub-window number, that the DCI is intended for the UE that transmitted the random access preamble and to process a second of the one or more transmissions.

17. The baseband processor of claim 16, wherein the time sub-window number is associated with a time of transmission of the random access preamble.

18. The baseband processor of claim 16, wherein the window for monitoring for the RAR message is larger than a sub-window.

19. The baseband processor of claim 16, wherein the time sub-window number resolves DCI transmissions relating to random access preamble transmissions in different radio frames using a same MSGB-RNTI.

20. The baseband processor of claim 16, wherein the time duration is sufficiently large to include up to N transmissions of the RAR message, and wherein N is greater than one.

\* \* \* \* \*